United States Patent
Sinha et al.

(10) Patent No.: US 10,728,113 B2
(45) Date of Patent: Jul. 28, 2020

(54) SYSTEMS AND METHODS FOR TROUBLESHOOTING AND PERFORMANCE ANALYSIS OF CLOUD BASED SERVICES

(71) Applicant: Zscaler, Inc., San Jose, CA (US)

(72) Inventors: Amit Sinha, San Jose, CA (US); Prem Mohan, Cupertino, CA (US); Arshi Chadha, Patiala (IN); Preeti Arora, Zirakpur (IN); Ajit Singh, San Jose, CA (US); Purvi Desai, Cupertino, CA (US)

(73) Assignee: Zscaler, Inc., San Jose, CA (US)

( * ) Notice: Subject to any disclaimer, the term of this patent is extended or adjusted under 35 U.S.C. 154(b) by 331 days.

(21) Appl. No.: 15/377,051

(22) Filed: Dec. 13, 2016

(65) Prior Publication Data

US 2018/0115463 A1    Apr. 26, 2018

(30) Foreign Application Priority Data

Oct. 26, 2016 (IN) .............................. 201611036718

(51) Int. Cl.
*H04L 12/24* (2006.01)
*H04L 12/26* (2006.01)

(52) U.S. Cl.
CPC ...... *H04L 41/5009* (2013.01); *H04L 41/5067* (2013.01); *H04L 43/10* (2013.01); *H04L 41/0654* (2013.01)

(58) Field of Classification Search
None
See application file for complete search history.

(56) References Cited

U.S. PATENT DOCUMENTS

| | | |
|---|---|---|
| 8,464,335 B1 | 6/2013 | Sinha et al. |
| 8,495,737 B2 | 7/2013 | Sinha et al. |
| 8,955,091 B2 | 2/2015 | Kailash et al. |
| 9,060,239 B1 | 6/2015 | Sinha et al. |
| 9,369,433 B1 | 6/2016 | Paul et al. |
| 9,473,537 B2 | 10/2016 | Sinha et al. |
| 2011/0277027 A1* | 11/2011 | Hayton ............... H04L 63/0815 726/8 |
| 2012/0304244 A1* | 11/2012 | Xie ........................ G06F 21/00 726/1 |

(Continued)

*Primary Examiner* — Natisha D Cox
(74) *Attorney, Agent, or Firm* — Clements Bernard Walker; Lawrence A. Baratta, Jr.

(57) ABSTRACT

A method for troubleshooting and performance analysis of a cloud based system, the method implemented by an analyzer service executed on one or more servers, and the analyzer service communicatively coupled to a network and to user devices, the method includes receiving results from execution of an analyzer application on each of the user devices, wherein the analyzer application is executed locally on user devices to perform tests comprising traceroutes and web page loads, and wherein the plurality of tests are performed both through the cloud based system to the network and directly to the network; processing the results to determine a status of the cloud based system and associated user devices communicating therewith; utilizing the status to identify bottlenecks and issues associated with the cloud based system and the network; and causing performance of remedial actions based on the identified bottlenecks and the issues.

18 Claims, 23 Drawing Sheets

(56) References Cited

U.S. PATENT DOCUMENTS

| | | | |
|---|---|---|---|
| 2013/0311832 A1* | 11/2013 | Lad | H04L 41/042 |
| | | | 714/37 |
| 2015/0195291 A1* | 7/2015 | Zuk | H04L 63/145 |
| | | | 726/23 |
| 2015/0326613 A1 | 11/2015 | Devarajan et al. | |
| 2017/0210731 A1* | 7/2017 | Kumar | C07D 213/73 |
| 2017/0250887 A1* | 8/2017 | Sadana | H04L 41/046 |
| 2017/0315902 A1* | 11/2017 | Moretto | G06F 11/3672 |
| 2017/0366421 A1* | 12/2017 | Dam | H04L 43/045 |

\* cited by examiner

SYSTEMS AND METHODS FOR TROUBLESHOOTING AND PERFORMANCE ANALYSIS OF CLOUD BASED SERVICES

CROSS-REFERENCE TO RELATED APPLICATION(S)

The present patent/application claims priority to Indian Patent Application No. 201611036718, filed on Oct. 26, 2016, and entitled "SYSTEMS AND METHODS FOR TROUBLE SHOOTING AND PERFORMANCE ANALYSIS OF CLOUD BASED SERVICES," the contents of which are incorporated by reference.

FIELD OF THE DISCLOSURE

The present disclosure generally relates to computer networking systems and methods. More particularly, the present disclosure relates to systems and methods for troubleshooting and performance analysis of cloud services.

BACKGROUND OF THE DISCLOSURE

Cloud based services are proliferating. Various enterprise and consumer applications that were based on software and/or hardware hosted by the end user are increasingly being offered as a service delivered through the cloud. For example, instead of running local email servers in the office and have employees use email client software to access emails and calendars, enterprises are adopting cloud based services such as Microsoft Office365 or Google Apps. Employees can use a web browser or a mobile device to simply access the service directly from the cloud. Similar trends are happening as enterprises are adopting applications such as Salesforce.com for Customer Relationship Management (CRM), Box for storage, Workday for Human Resources Management (HRM), and the like. Advantageously, cloud based services are cost effective (removing local hardware and operational costs), platform agnostic (accessible from a host of user devices such as mobile phones, tablets, laptops, etc.), offer better availability (less downtime and secure backups), and the like.

Similar trends are happening in enterprise networking and security. The Information Technology (IT) landscape has shifted dramatically. Cloud computing, mobility, and the Internet of Things are massive, unstoppable trends and have created new challenges for IT departments, ranging from security against new threat vectors to ensuring compliance with corporate policies and protecting against data loss. Organizations are finding that individual point solutions like firewalls, Unified threat management (UTMs), Identity Providers (IDPs), and virus scanning have difficulty addressing constantly changing threats and are challenging to tie together in a cohesive fashion to effectively identify and block the full breadth of threats. Further, organizations are seeing that such centralized, hardware-based security gateways simply no longer make sense in today's perimeter-less Internet, cloud, and the mobile-first world. Organizations are looking to cloud based solutions to reduce security administrative overhead and streamline capital investments in security infrastructure. They see the significant value of purchasing security as a service as opposed to purchasing numerous point products that address individual issues and are limited to the corporate perimeter. One exemplary type of security enforcement platform is a cloud-based distributed security system, such as available from Zscaler, Inc., the assignee of the present application. Such distributed security systems are multi-tenant and can manage thousands or even millions of user devices, seamlessly regardless of location, platform, device type, etc.

The adoption of cloud based services for applications and security create new challenges when it comes to benchmarking performance or troubleshooting issues. Cloud based services require good network connections between the end user client and the service. The service could be hosted on the Internet or on a private cloud infrastructure. There may be network latency issues when accessing the service resulting in a poor user experience. The service itself could have Service Level Agreements (SLAs) around performance and availability. Being able to benchmark key performance and availability metrics and have tools that can isolate faults and bottlenecks that could be degrading user experience is critical for the successful adoption of cloud services.

BRIEF SUMMARY OF THE DISCLOSURE

In an exemplary embodiment, a method for troubleshooting and performance analysis of a cloud based system, the method implemented by an analyzer service executed on one or more servers, and the analyzer service communicatively coupled to a network and to a plurality of user devices, the method includes receiving results from execution of an analyzer application on each of the plurality of user devices, wherein the analyzer application is executed locally on user devices to perform a plurality of tests including one or more traceroutes and one or more web page loads, and wherein the plurality of tests are performed both through the cloud based system to the network and directly to the network; processing the results to determine a status of the cloud based system and associated user devices communicating therewith; utilizing the status to identify bottlenecks and issues associated with the cloud based system and the network; and causing performance of one or more remedial actions based on the identified bottlenecks and the issues.

In another exemplary embodiment, a cloud based system configured for troubleshooting and performance analysis thereof includes one or more cloud nodes executed on one or more servers and communicatively coupled to a plurality of user devices via a network for cloud access; and an analyzer service executed on one or more servers and communicatively coupled to the one or more cloud nodes and the plurality of user devices, wherein the analyzer service is configured to receive results from execution of an analyzer application on each of the plurality of user devices, wherein the analyzer application is executed locally on user devices to perform a plurality of tests including one or more traceroutes and one or more web page loads, and wherein the plurality of tests are performed both through the cloud based system to the network and directly to the network; process the results to determine a status of the cloud based system and associated user devices communicating therewith; utilize the status to identify bottlenecks and issues associated with the cloud based system and the network; and cause performance of one or more remedial actions based on the identified bottlenecks and the issues.

In a further exemplary embodiment, a user device configured for troubleshooting and performance analysis of a cloud based system includes a network interface communicatively coupled to a network, a data store, and a processor communicatively coupled to one another; and memory storing computer executable instructions, and in response to execution by the processor, the computer-executable instructions cause the processor to access the cloud based system for one or more functions therewith; execute an analyzer application to perform a plurality of tests including one or more traceroutes and one or more web page loads, and wherein the plurality of tests are performed both through the cloud based system to the network and directly to the network; and transmit the results to an analyzer service which processes the results to determine a status of the cloud based system and associated user devices communicating therewith, wherein the analyzer service utilizes the status to identify bottlenecks and issues associated with the cloud based system and the network and causes performance of one or more remedial actions based on the identified bottlenecks and the issues.

BRIEF DESCRIPTION OF THE DRAWINGS

The present disclosure is illustrated and described herein with reference to the various drawings, in which like reference numbers are used to denote like system components/method steps, as appropriate, and in which:

FIG. 23 is results from the exemplary implementation of the MTR of FIG. 21;

FIG. 24 is results from the exemplary implementation of the webload of FIG. 22.

DETAILED DESCRIPTION OF THE DISCLOSURE

Again, in various exemplary embodiments, the present disclosure relates to systems and methods for troubleshooting and performance analysis of cloud based services. The systems and methods allow cloud based service providers better support for their customers when faced with performance or availability issues. It provides a customer-centric view of the cloud based service and can help isolate where bottlenecks exist that may impact SLAs and degrade the user experience. Issues can exist on the user device, the network between the user device and the cloud based service or within the cloud based service itself. Through automated collection of network and service metrics along with rich troubleshooting data, an analyzer application ("app") implemented through the systems and methods improves the reliability and performance of the cloud based service for users.

In an exemplary embodiment, a cloud based service provider can provide a cloud based security system which provides in-line protection of user devices, independent of device type, hardware configuration, operating system, geographic location, physical network location, and the like. That is, the cloud based security system can be overlaid between the user device and other networks such as the Internet. Of note, the cloud based security system is in-between (in-line) the user and an ultimate destination (domain, enterprise, etc.) providing continuous monitoring for malware, spyware, botnets, viruses, email spam, Data Leakage Prevention (DLP), content filtering, policy adherence, etc. Also, this in-line monitoring can have issues due to network misconfigurations and the like, causing increased latency, poor response time, etc. An exemplary use case of the analyzer app is to analyze the path between a user device and a cloud node or to analyze the time it takes for a browser to load a web page, so a cloud support team can detect potential issues. The app can perform an MTR traceroute and a full web page load test. The results provide the cloud support team with information needed to debug network issues quickly. The analyzer app can be executed multiple times at different intervals, for a more comprehensive view of the network path and performances. For example, the analyzer app can be configured to run at predefined time intervals. The results can be used by the cloud support team for analysis, troubleshooting, network planning, and the like. The overall view of the entire cloud allows interpretation of the data to identify potential issues in the network path. The analyzer app can be used ongoing to provide continual feedback and as part of troubleshooting specific instances. As such, the analyzer app can shorten the amount of time to debug and fix issues as well as guide the cloud service provider towards improving the overall cloud based system.

§ 1.0 Example High-Level System Architecture—Cloud-Based Security System

Figure 1:
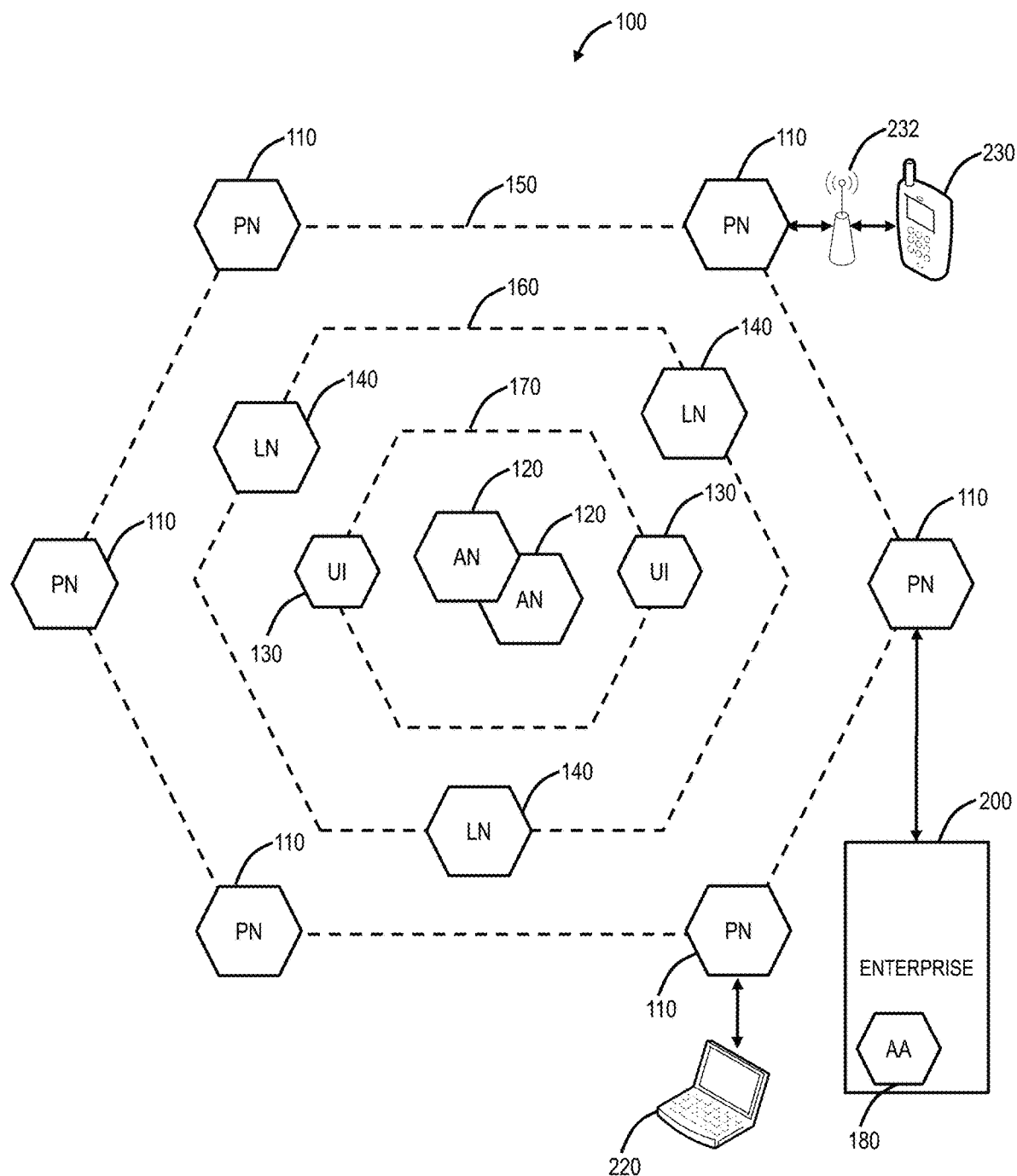
FIG. 1 is a network diagram of a distributed security system.

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, Data Leakage Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is processed through one of the processing nodes 110.

Each of the processing nodes 110 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part $C=[c1, c2, \ldots, cm]$ of the content item, at any of the processing nodes 110, any one of the data inspection engines generates an output that results in a classification of "violating."

Figure 3:
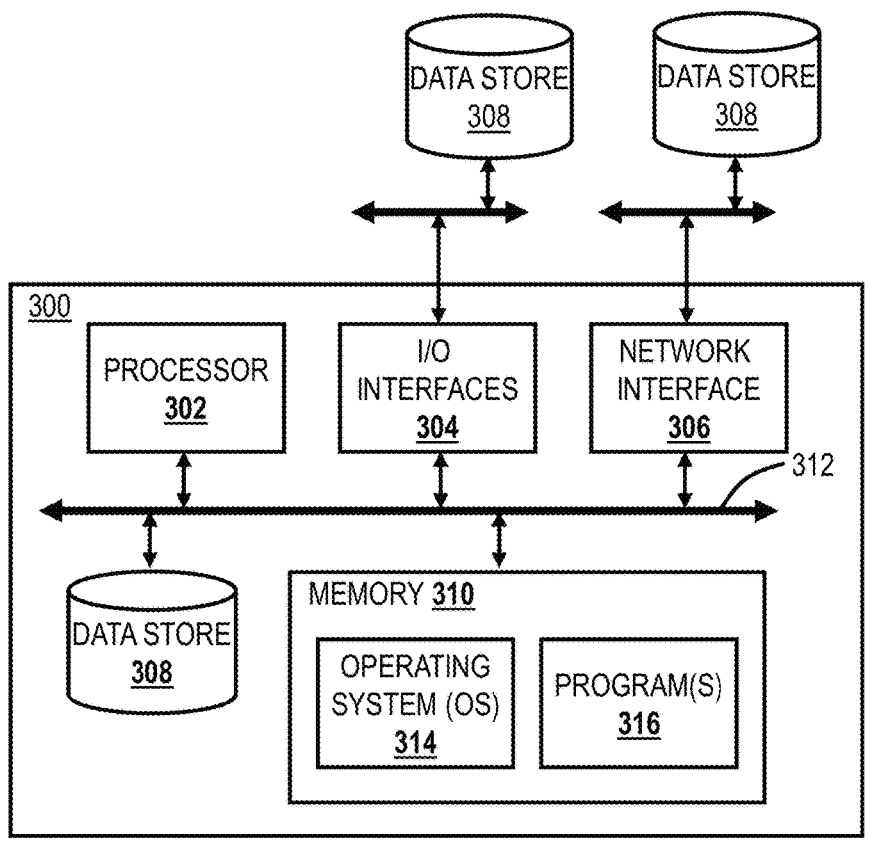
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicate to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain websites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, within the enterprise, the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the tracking and auditing systems and methods contemplate operation on any cloud-based system.

§ 2.0 Example Detailed System Architecture and Operation

Figure 2:
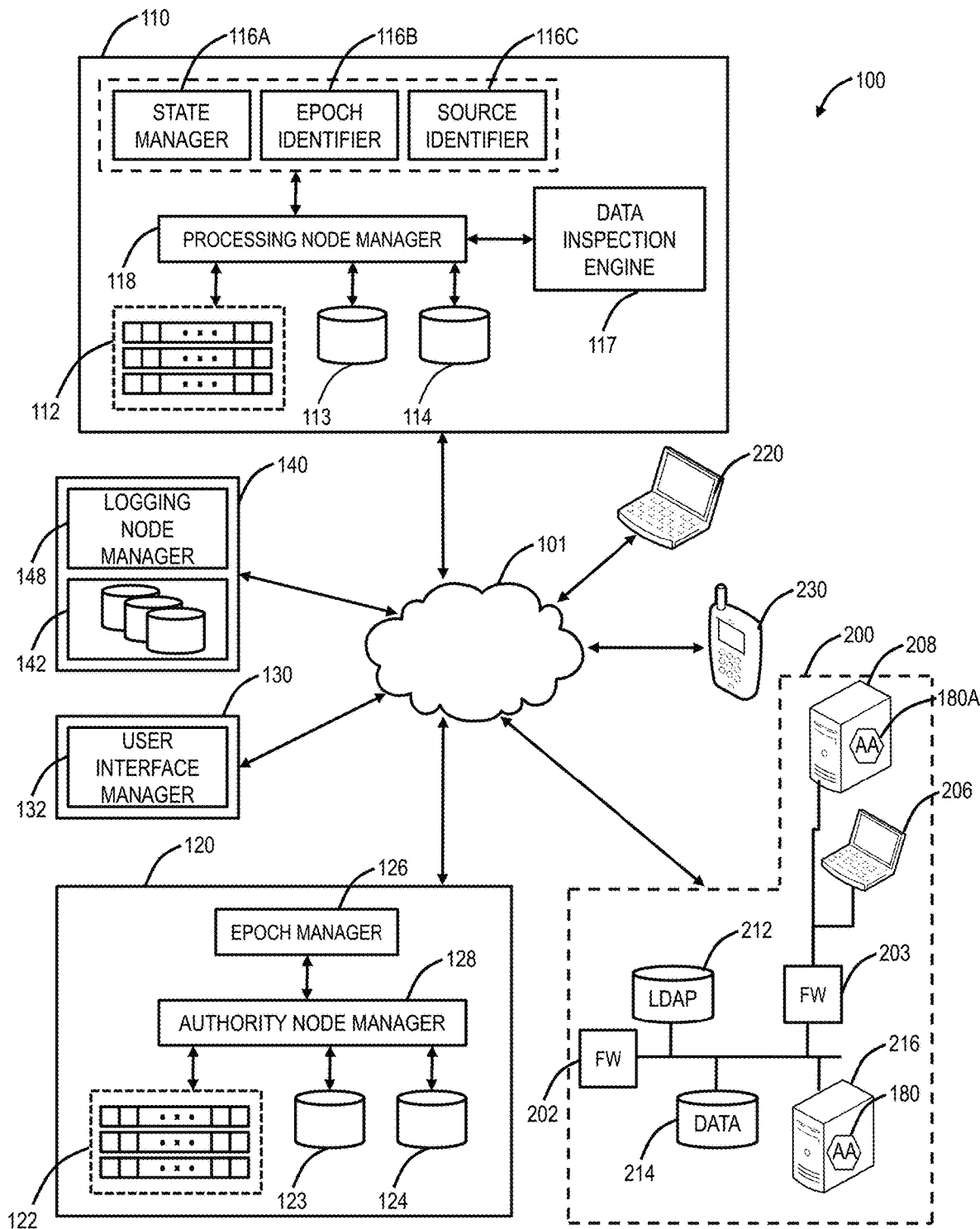
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 206. The client access agent 180a may, for example, facilitate security processing by providing a hash index of files on the user computer 206 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the computers 206 of the enterprise 200, or to some other secure data provider server. The computer device 220 and the mobile device 230 can also store information warranting security measures, such as personal bank records, medical information, and login information, e.g., login information to a server 216 of the enterprise 200, or to some other secure data provider server.

§ 2.1 Example Processing Node Architecture

In an exemplary embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item.

Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§ 3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Exemplary Mobile Device Architecture

Figure 4:
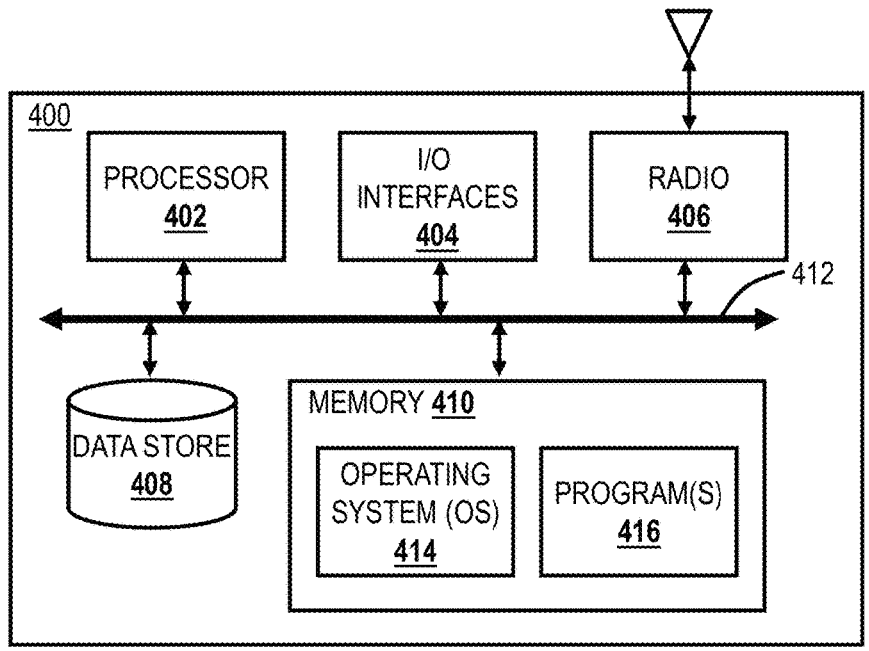
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Exemplary General Cloud System

Figure 5:
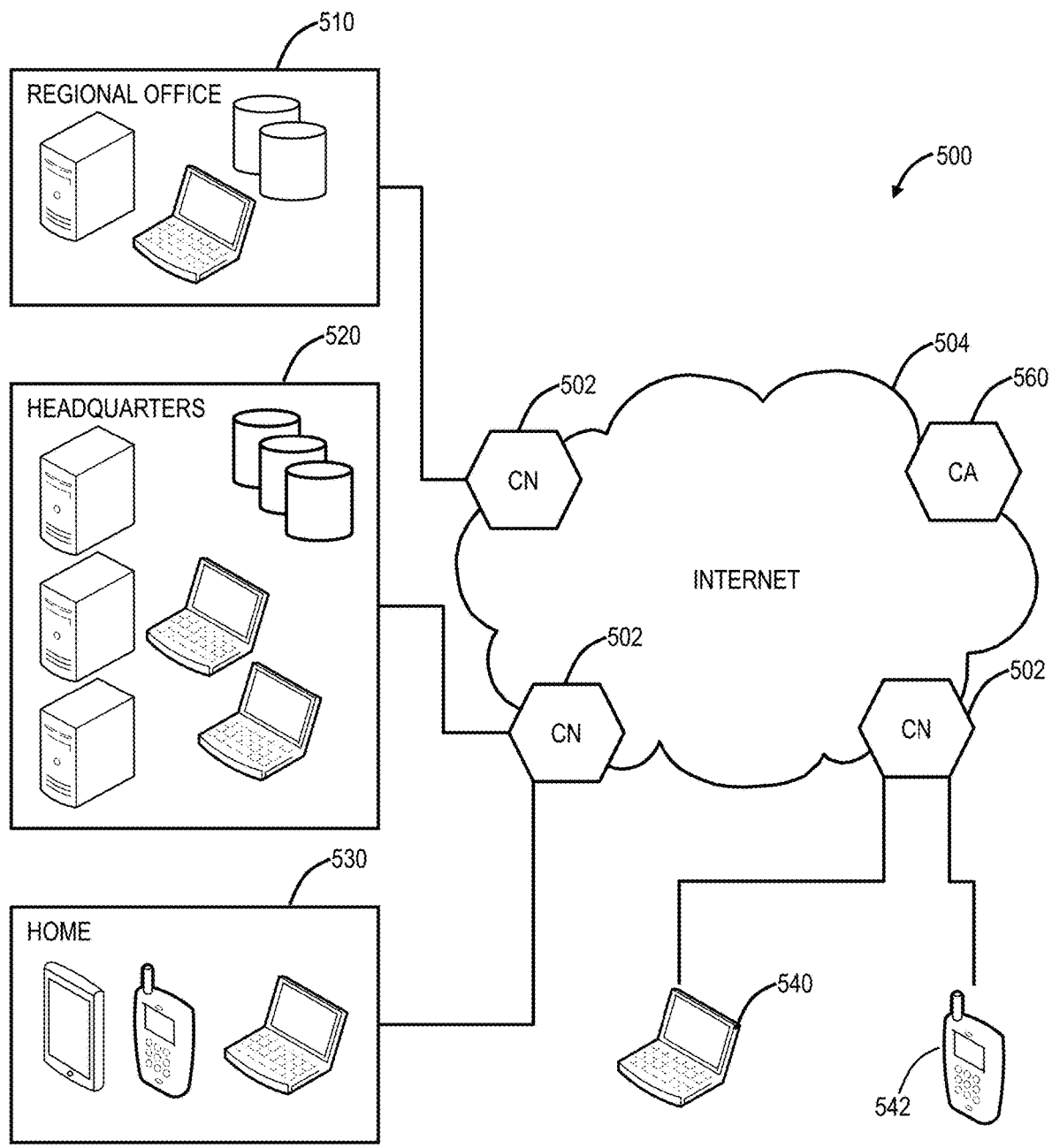
FIG. 5 is a network diagram of a generalized cloud-based system.

Referring to FIG. 5, in an exemplary embodiment, a cloud system 500 is illustrated for implementing the systems and methods described herein for tracking and auditing changes in a multi-tenant cloud system. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud-based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is, each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an exemplary embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an exemplary embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

§ 6.0 DNS Augmented Security

In an exemplary embodiment, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 502 are in the data path of connecting users. Another approach can include a passive approach to the data path. DNS is one of the most fundamental IP protocols. With DNS surrogation as a technique, it is proposed to use DNS for dynamic routing of traffic, per-user authentication and policy enforcement, and the like.

In conjunction with the cloud system 500 and/or the distributed security system 100, various techniques can be used for monitoring which is described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
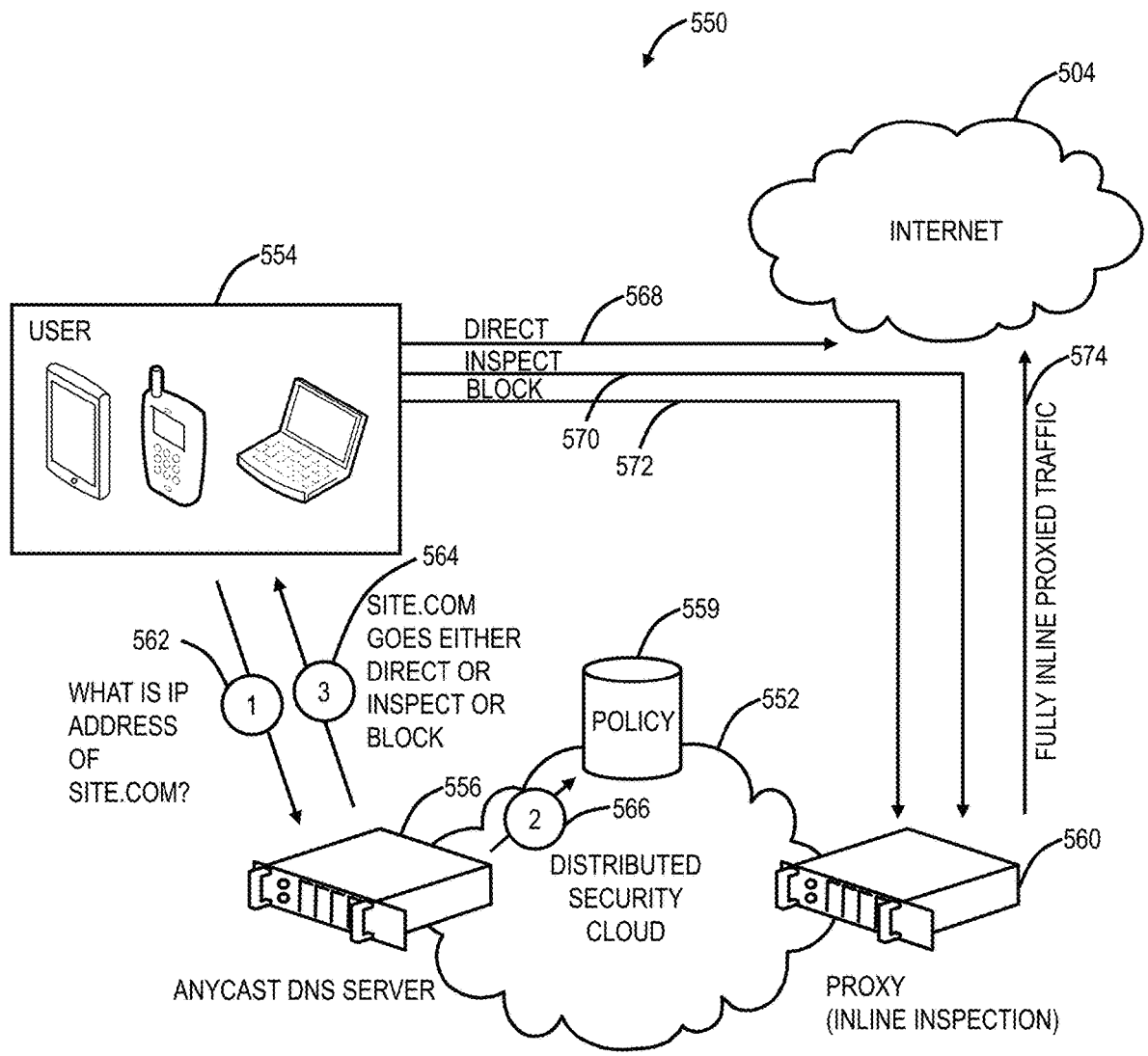
FIG. 6 is a network diagram of a network with a distributed security cloud providing DNS augmented security.

Referring to FIG. 6, in an exemplary embodiment, a network diagram illustrates a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully in line proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§ 7.0 Cloud Based Analyzer

Figure 7:
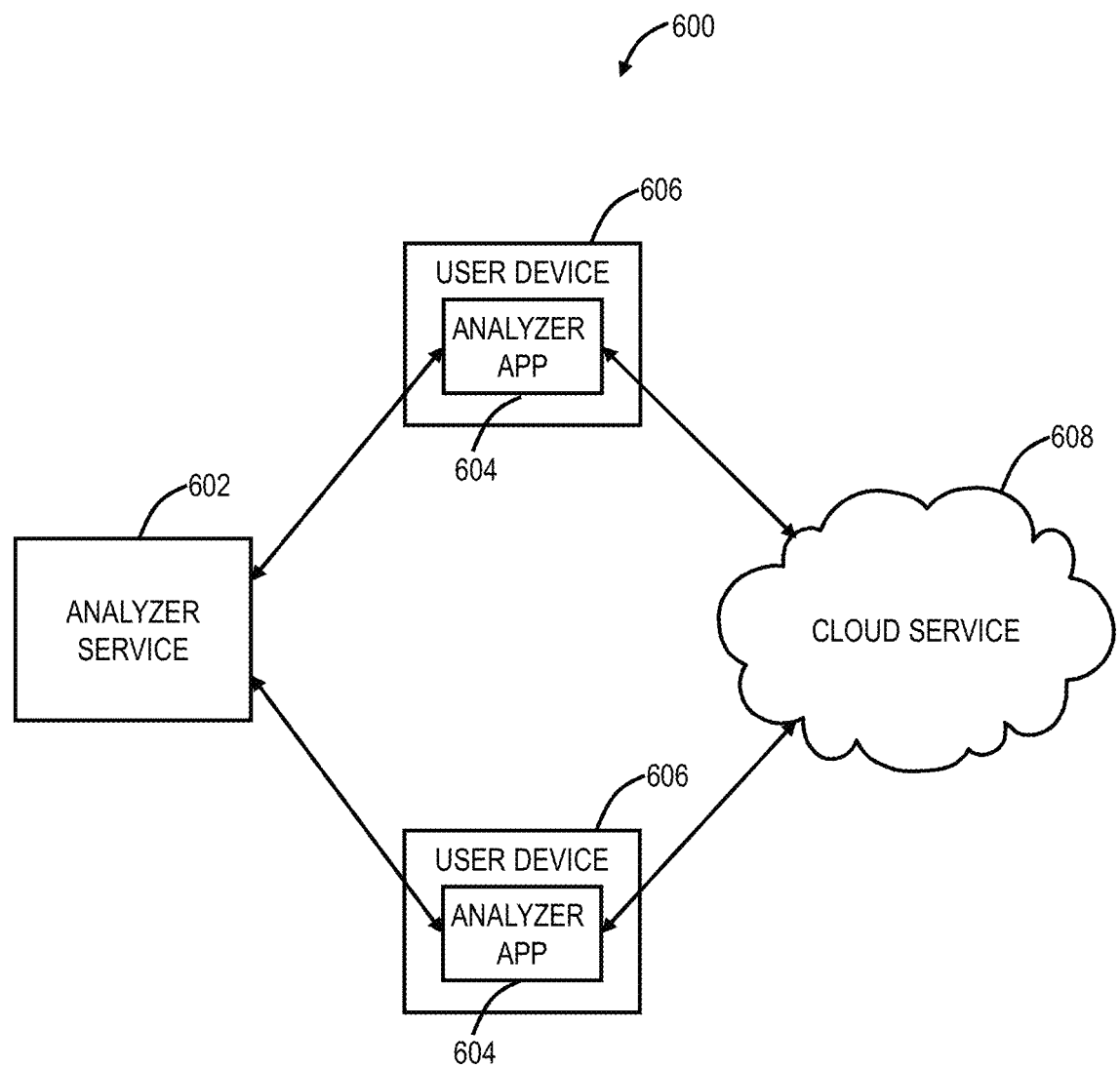
FIG. 7 is a network diagram of a network with a cloud based analyzer service operating with analyzer apps on client devices using a cloud based service.
Figure 8:
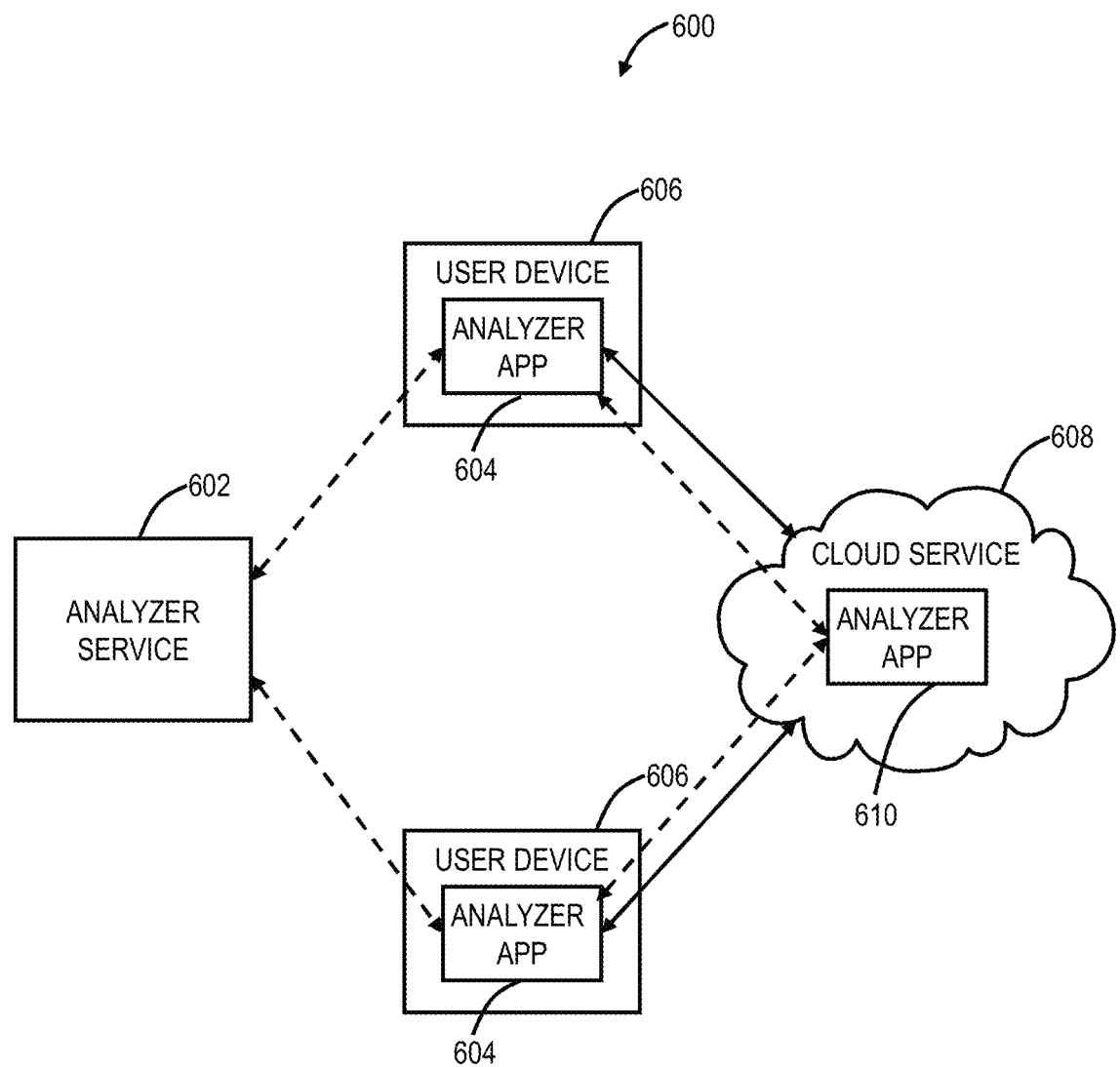
FIG. 8 is a network diagram of a network with the cloud based analyzer service operating with analyzer apps on client devices using a cloud based service along with an analyzer app also operating in the cloud based service.
Figure 9:
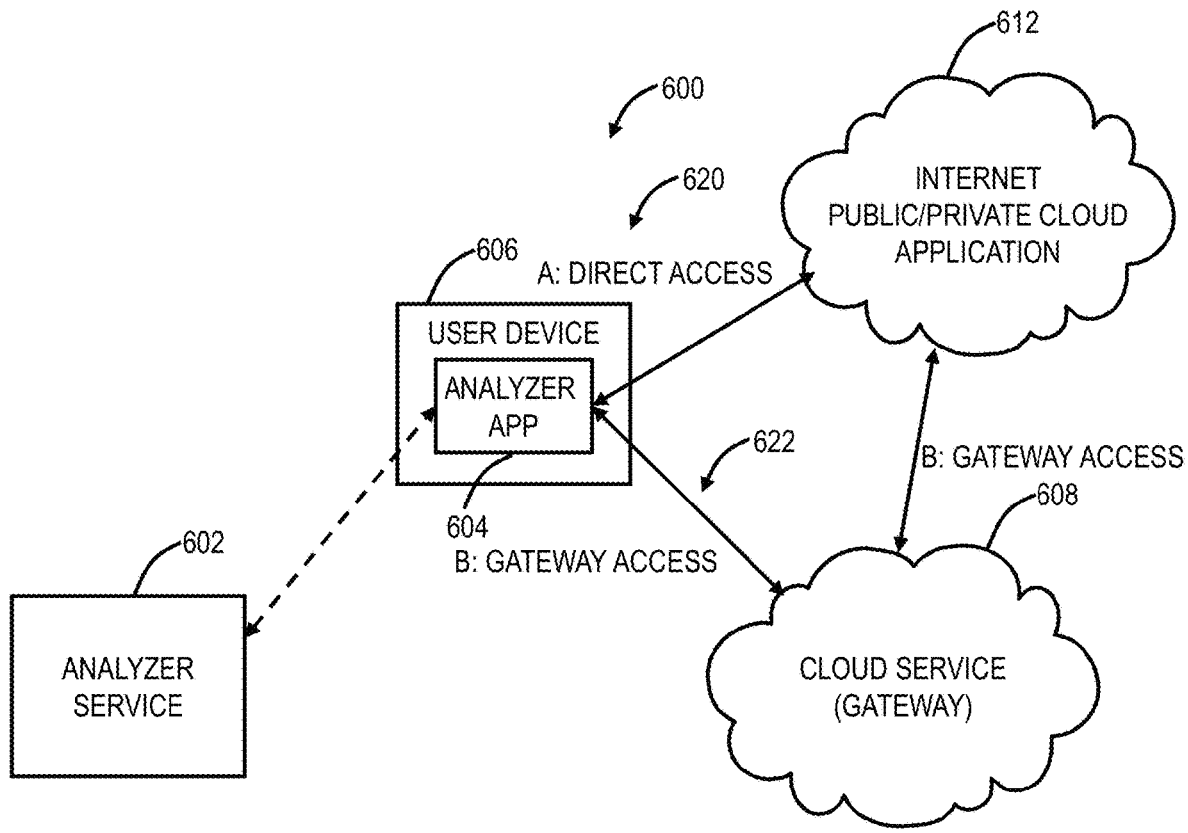
FIG. 9 is a network diagram of a network with the cloud based analyzer service operating with analyzer apps on client devices using the cloud based service as a gateway for another cloud, such as the Internet, public/private cloud applications, etc.

Referring to FIGS. 7-9, in an exemplary embodiment, network diagrams illustrate a network 600 with a cloud based analyzer service 602 operating therein. FIG. 7 illustrates the network 600 with the cloud based analyzer service 602 operating with analyzer apps 604 on user devices 606 using a cloud based service 608. FIG. 8 illustrates the network 600 with the cloud based analyzer service 602 operating with analyzer apps 604 on client devices 606 using a cloud based service 608 along with an analyzer app 610 also operating in the cloud based service 608. FIG. 9 illustrates the network 600 with the cloud based analyzer service 602 operating with analyzer apps 604 on user devices 606 using the cloud based service 608 as a gateway for another cloud 612, such as the Internet, public/private cloud applications, etc.

The cloud based service 608 is any application or service delivered via a cloud based platform. This could be an Internet-based service or hosted on public or private cloud infrastructure. The cloud based service 608 can be the distributed security system 100, the cloud system 500, the distributed security cloud 552, or the like. The user device 606 is an end user device that accesses the cloud based service 608. This could be a laptop or mobile device or any other device that connects to the cloud based service 608 and leverages it. The user device 606 can be the computer device 220, the mobile device 230, the mobile device 400, the mobile laptop 540, the mobile device 542, etc.

The analyzer app 610 is an application (computer-readable instructions) that is run on the user device 606 to collect diagnostic information and SLA-related metrics for the cloud based service 608. The analyzer service 602 can be a cloud based service communicatively coupled to the analyzer app 610 (and to various analyzer apps 610) to archive and analyze collected metrics and to update and control the analyzer app 610. The analyzer service 610 can be part of the physical cloud where the cloud based service 608 is hosted or separate.

Again, in operation, the analyzer app 604 operates on the user device 606 to collect network diagnostics between the user device 606 and the cloud based service 608. In FIG. 7, the analyzer apps 604 are run on various user devices 606 to collect data based on performance monitoring with the cloud based service 608 and to communicate the collected data to the analyzer service 602. In FIG. 8, the analyzer app 604 is also run in the cloud based service 608, such as one or more instances communicatively coupled to associated user devices 606 as needed for performing a test. This enables additional local diagnostics in the cloud based service 608 to share with the corresponding analyzer app 604 on the user device 606 as well as providing for bi-directional visibility between the user device 606 and the cloud based service 608 for performance and availability.

In FIG. 9, the cloud based service 608 is a gateway for an ultimate end destination such as the cloud 612. This gateway example is the use case where the cloud based service 608 is the distributed security cloud 100 or the like for in-line monitoring. Requests from the user device 606 are proxied to the end destination that could be on the Internet or hosted on a public or private cloud, the cloud 12. The analyzer app 604 can profile performance when going direct (via path A 620) versus going through the cloud based service 608 as a gateway (via path B 622). Importantly, the comparative performance metrics between the paths 620, 622 provide insight into the performance issues using the cloud based service 608 for in-line monitoring. These insights can be used to configure the cloud based service 608, to add additional capacity in both the associated network and computing power of the cloud based service 608, to troubleshoot the cloud based service 608, and the like. Importantly, in-line monitoring should be as efficient as possible to avoid degradation in the user experience. These insights provide the cloud based provider opportunity for optimization. In FIG. 9, it is possible to download build in websites or user-specified websites with and without the proxy (the cloud based service 608) to measure download times.

Examples of the network diagnostic include MTR trace to detect intermediate hops and latency at each hop. My traceroute (MTR) is a computer program which combines the functions of the traceroute and ping programs in one network diagnostic tool. MTR probes routers on the route path by limiting the number of hops individual packets may traverse, and listening to responses of their expiry. It will regularly repeat this process, usually once per second, and keep track of the response times of the hops along the path. The MTR can include packet captures when certain conditions are detected and be used to derive network metrics such as throughput, error rates, jitter, etc. The MTR can be used to detect intermediate hops and latency at each hop. The MTR can also perform multi-point traceroutes through the cloud based service 608 to determine optimal paths within the cloud based service 608.

The analyzer app 604 can measure SLA metrics associated with the cloud based service 606 including processing latency introduced by service, response times for one or more requests, application performance metrics, service availability, and the like. The processing latency is based on the various aforementioned techniques related to security processing in the cloud. Optimization of this processing latency is important for proper user experience. One exemplary approach to measure SLA metrics includes a webload functionality which analyzes the time it takes an embedded web browser on the user device 606 to load a web page. In FIG. 9, the webload functionality can be performed with and without the cloud based service 608 to compare the results. In the case where the cloud based service 608 is a distributed security cloud 100, the webload without the cloud based service 608 can be constrained to a known good website to avoid potential problems since the cloud based service 608 is not used for security monitoring here. Also, the user device 606 can be configured only to avoid the cloud based system 608 with the analyzer app 604 for metric collections.

The analyzer app 604 can be set to run on a preconfigured schedule, in response to certain cloud based service 608 events, and/or specific anomalies detected in the user device 606. The preconfigured schedule provides the analyzer service 602 continuous metrics to monitor health over time of the entire cloud based service 608. For example, every night at a certain time and every day at a certain time. Various other preconfigured schedules are contemplated. For the cloud based service events, the cloud based service 608 can be configured to cause the analyzer apps 604 to operate, such as via communication thereto or to the analyzer service 602. For example, the cloud based service 608 can detect performance degradation such as particular locations and instruct some or all user devices 606 to operate the analyzer app 604. Again, various other combinations are contemplated. Also, the user device 606 itself can automatically run the analyzer app 604 based on local detection of anomalies, such as poor response time to the cloud based service 608 or the like.

The analyzer app 604 can log all metrics in a standardized format and periodically transmit the logs to the analyzer service 602 with timestamps, details of the user device 606, and other relevant information. The analyzer service 602 provides operators of the cloud based service 608 an ability to analyze the metrics and isolate faults that may impact user experience. Also, the metrics can be used for network planning and the like. For example, a particular location is showing poor service due to increased usage, and the outcome could be to add network or processing capacity in that particular location to the cloud based service 608. The analyzer service 602 also can be used to update the analyzer apps 604 with new functionality, fixes, and configurations.

The analyzer app 604 can be installed via software distribution from the Web, from the App Store (Apple), Google Play (Google), Windows marketplace (Microsoft), or the like. The analyzer app 604 and the analyzer service 602 both support Graphical User Interfaces (GUI). The analyzer app 604 can include scheduling configuration parameters via the GUI which may be modifiable by the user or locked and only modifiable by IT administrators. The GUI in both the analyzer app 604 and the analyzer service 602 can support analytics displays and the like.

§ 7.1 MTR

The MTR is used to analyze the path between the user device 606 and a node in the cloud based service 608, such as the processing node 110 or the cloud node 502. The analyzer app 604 performs an MTR (My Traceroute), and the results provide the analyzer service 602 with all the information needed to debug network issues quickly. Again, the analyzer app 604 can be run multiple times at different intervals, for a more comprehensive view of the network path. The results are designed to be sent to the analyzer service 602 for analysis. The experience and overall view of the entire cloud allow operators of the cloud based service 608 an opportunity to interpret the data and identify potential issues in the network path. In an exemplary embodiment, the MTR is not run through a tunnel such as GRE or IPSec.

§ 7.2 Analyzer App GUI

Figure 10:
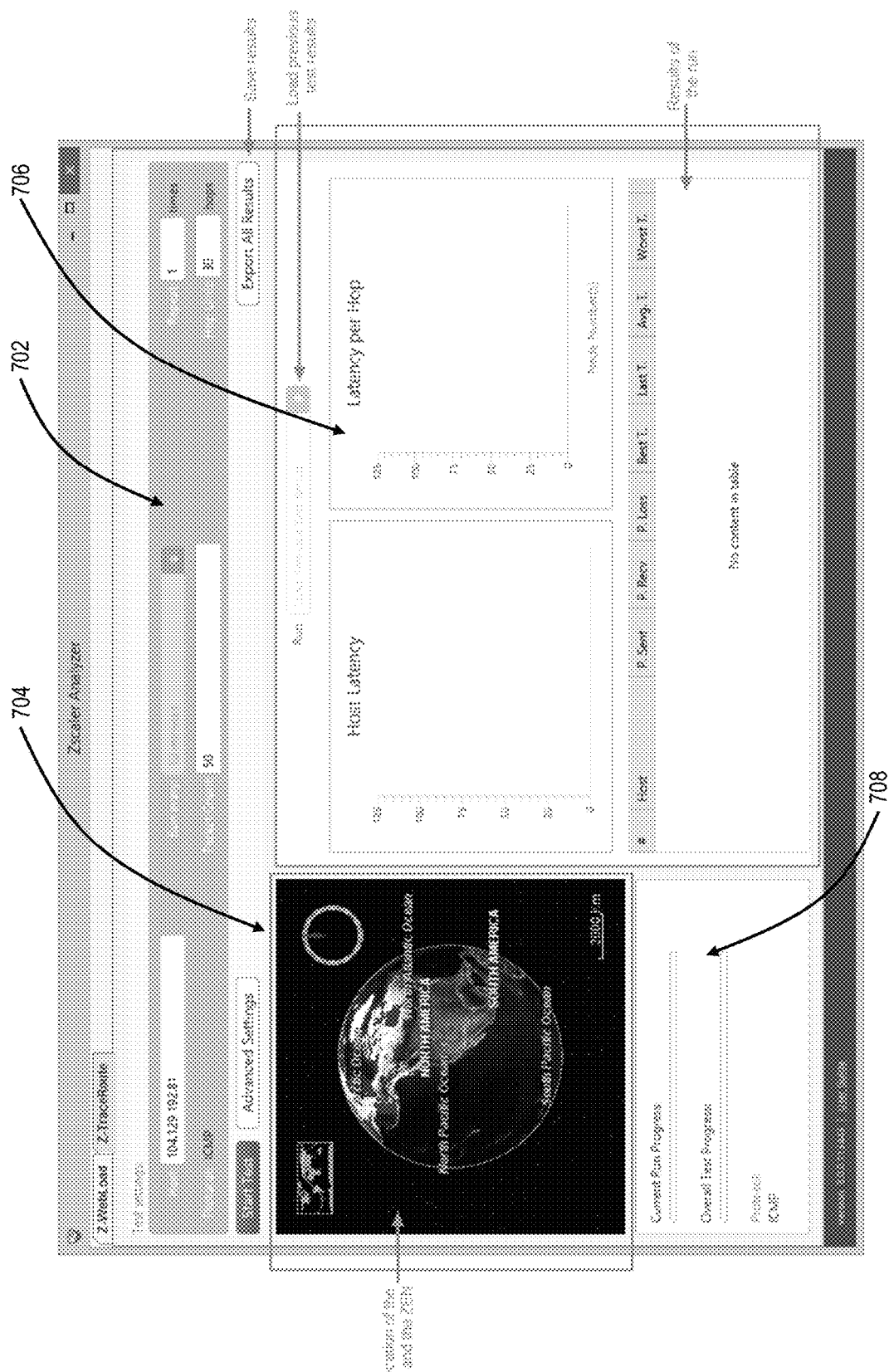
FIG. 10 is a Graphical User Interface (GUI) screen of the analyzer app at launch.

Referring to FIG. 10, in an exemplary embodiment, a GUI screen illustrates the analyzer app 604 at launch. The GUI includes settings 702, a geolocation location 704, test results 706, and status 708. The geolocation location 704 can be the location of the user device 606 such as based on its IP address and/or location information from GPS and the location of the cloud node 502 or the processing node 110. The settings 702 can be defined, such as for a host, run frequency, packet count, repetition, and hop limit. The host can be the cloud node 502, the processing node 110, or another defined node based on an IP address. The run frequency is based on the analyzer app 602 running automatically at different intervals. For example, to configure the app to run every hour, 10 times, change Repeat to 10, and then choose the interval to Repeat every 1 hour. These 10 tests are called a group. The packet count is a number of packets to send, and the hop limit is the maximum number of network hops measured.

Figure 11:
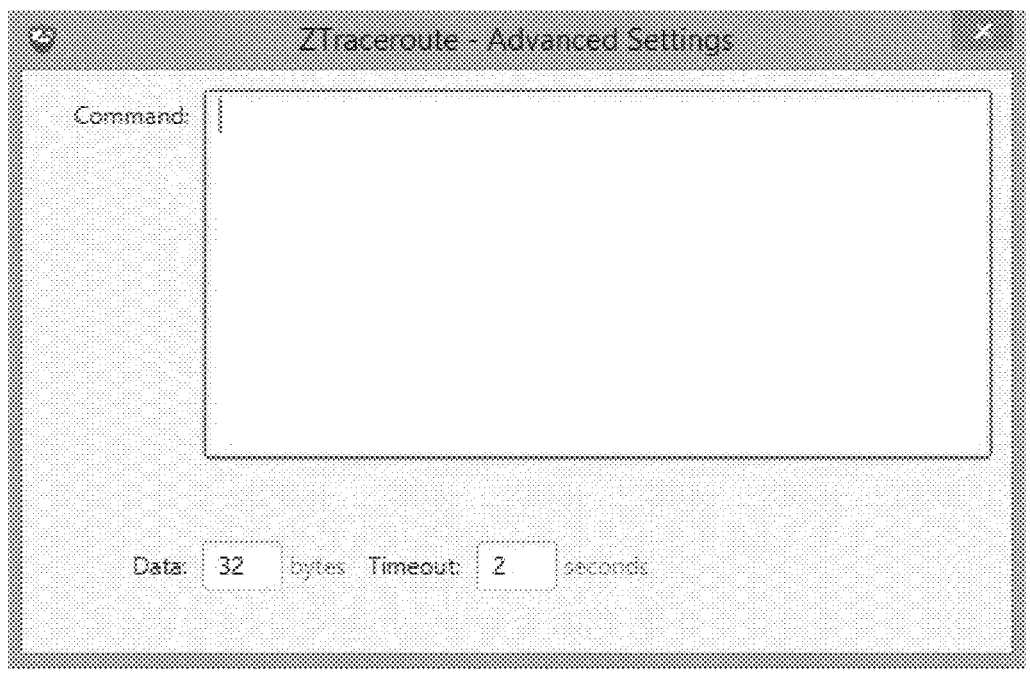
FIG. 11 is a GUI of a command line interface in the analyzer app.

There are advanced settings, for packet size in bytes, timeout, etc. Further, there is a command line, illustrated in FIG. 11, which allows configuration of advanced settings. Note, the settings, and the advanced settings can be set by the analyzer service 602 or the like. The following illustrates exemplary advanced settings.

| | | |
|---|---|---|
| o | run [host=] [protocol=] [port=] | |
| o | [repeat=] [interview=] [data=] | |
| o | [count=] [maxhop=] [timeout=] | |
| o | Options: | |
| o | host | Ping the specified host/IP address until stopped. |
| o | | Default : gateway.zscaler.net |
| o | protocol | Protocol to be used in probing. |
| o | | Valid : ICMP, TCP, UDP, Auto |
| o | | Default : ICMP |
| o | port | Port to be used in probing. |
| o | | Valid : [1 – 65535] |
| o | | Default : 80 |
| o | repeat | Number of times to repeat the test. |
| o | | Valid : [1 – 99] |
| o | | Default : 1 |
| o | interval | Gap between each test run (in minutes). |
| o | | Valid : [10, 15, 30, 60, 90, 120] |
| o | | Default : 10 |
| o | data | Length of raw data used. |
| o | | Valid : [1 – 60] |
| o | | Default : 32 |
| o | count | Number of packets per node. |
| o | | Valid : [1 – 99] |
| o | | Default : 50 |
| o | maxhop | Number of maximum hops. |
| o | | Valid : [1 – 60] |

| | | |
|---|---|---|
| ○ | | Default : 30 |
| ○ | timeout reply. | Timeout in seconds to wait for each |
| ○ | | Valid : [1 – 60] |
| ○ | | Default : 2 |

An example of the advanced settings can be:
run count=10 timeout=5 host=gateway.zscaler.net maxhop=50

Figure 12:
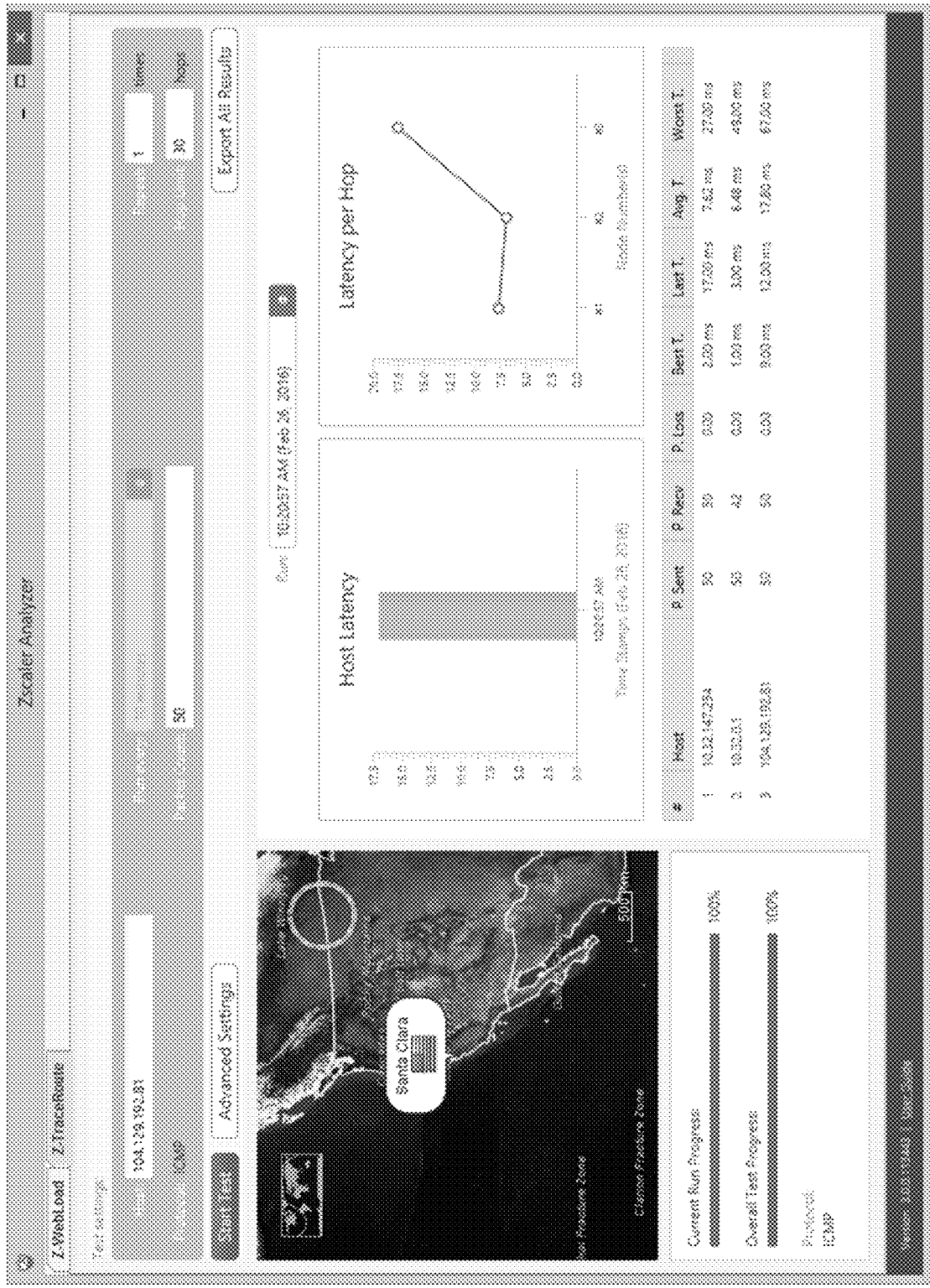
FIG. 12 is a GUI of an exemplary run of the analyzer app.

Referring back to FIG. 10, there is a radio button to start the test. The analyzer app 604 displays the geolocation of the user device 606 and the cloud node 502 on the map, as shown in FIG. 10. Note that the locations shown may not be accurate. This is useful in determining if the client is geolocalized correctly or if its traffic is not going to the nearest cloud node 502. FIG. 12 illustrates the results of an exemplary run. The analyzer app 604 updates the Host Latency and the Latency per Hop widgets, and the results table. The Stop Test button replaces the Start Test button, as shown below. If the user clicks the Stop Test button at any time, the analyzer app 604 cancels all the other tests in the group. The analyzer app 604 can be minimized before it completes all of the configured runs. When the analyzer app 604 completes all the runs, the Start Test button replaces the Stop Test button.

Figure 13:
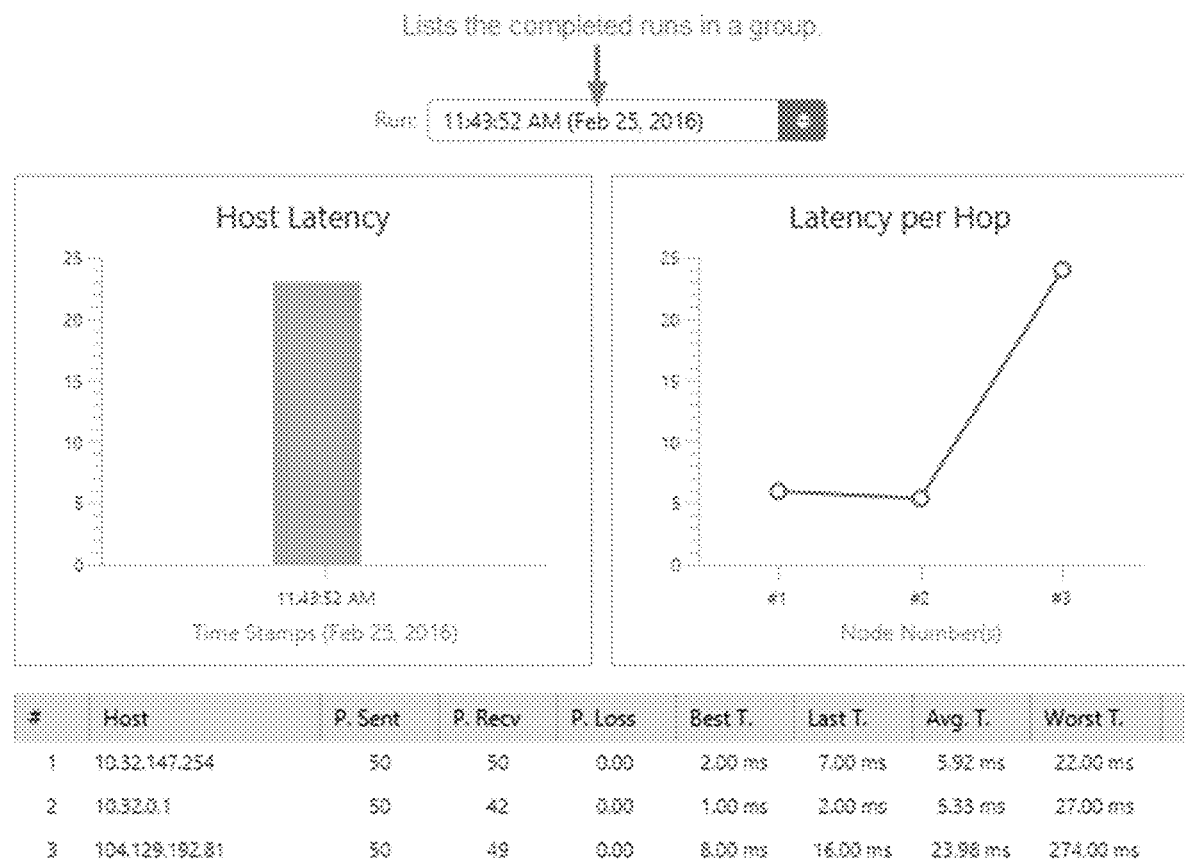
FIG. 13 is a GUI of test results in the analyzer app.

FIG. 13 illustrates a GUI of test results. If analyzer app 604 is configured to perform multiple runs, the results can be viewed for each completed run in the group by selecting it from the results list, as shown in FIG. 13. The Host Latency widget shows the latency that occurred when the device reached the cloud based service 608. The Latency per Hop widget shows the latency for each intermediate network hop. The results table provides an overview of the results. It shows the following: #: Hop number; Host: IP address of the intermediate host; P. Sent: The number of packets sent to the intermediate host; P. Recv: The number of packets sent back by the host; P. Loss: Percentage of packet loss; Best T.: Smallest latency of all tests in seconds; Last T.: Latency of the last packet sent; Avg. T.: Average latency; and Worst T.: Highest latency of all tests.

The results can be exported to the analyzer service 602, such as file a CSV file with a filename similar to za_results_12_15_2015_12_56_53_PM_PST. The following is the information displayed for each group (repetitions of the same test) in the CSV file: Result Import Time: Time of the data export; ZA Version: Version number of the app; Group Number: Group ID; ZA Settings: The defined settings for the test; Host: Name of the host from which the test was run; Internal Source IP: Local IP address of the device; Public Source IP: Public IP address of the outbound traffic; Protocol: Protocol selected for the test; and Number of Runs: Number of tests run. The following is the information displayed for each run inside a group: Run Number: Run ID; Start Time: Time when the test started; End Time: Time when the test ended; Test Finished in: Duration of the test; and SNo: Results of the test for each intermediate host. The Results of the test for each intermediate host can include Host: IP address of the intermediate host; Longitude: GeoIP coordinate of the intermediate host; Latitude: GeoIP coordinate of the intermediate host; Location Name: GeoIP country of the intermediate host; Packet Sent: Number of packets sent to the intermediate host; Packet Received: Number of packets sent back by the host; Loss: Number of packets lost; Last Time: Latency of the last packet sent; Best Time: Smallest latency of all tests; Worst Time: Highest latency of all tests; Avg Time: Average latency; and St Dev: Standard deviation.

§ 7.3 Webload

Figure 14:
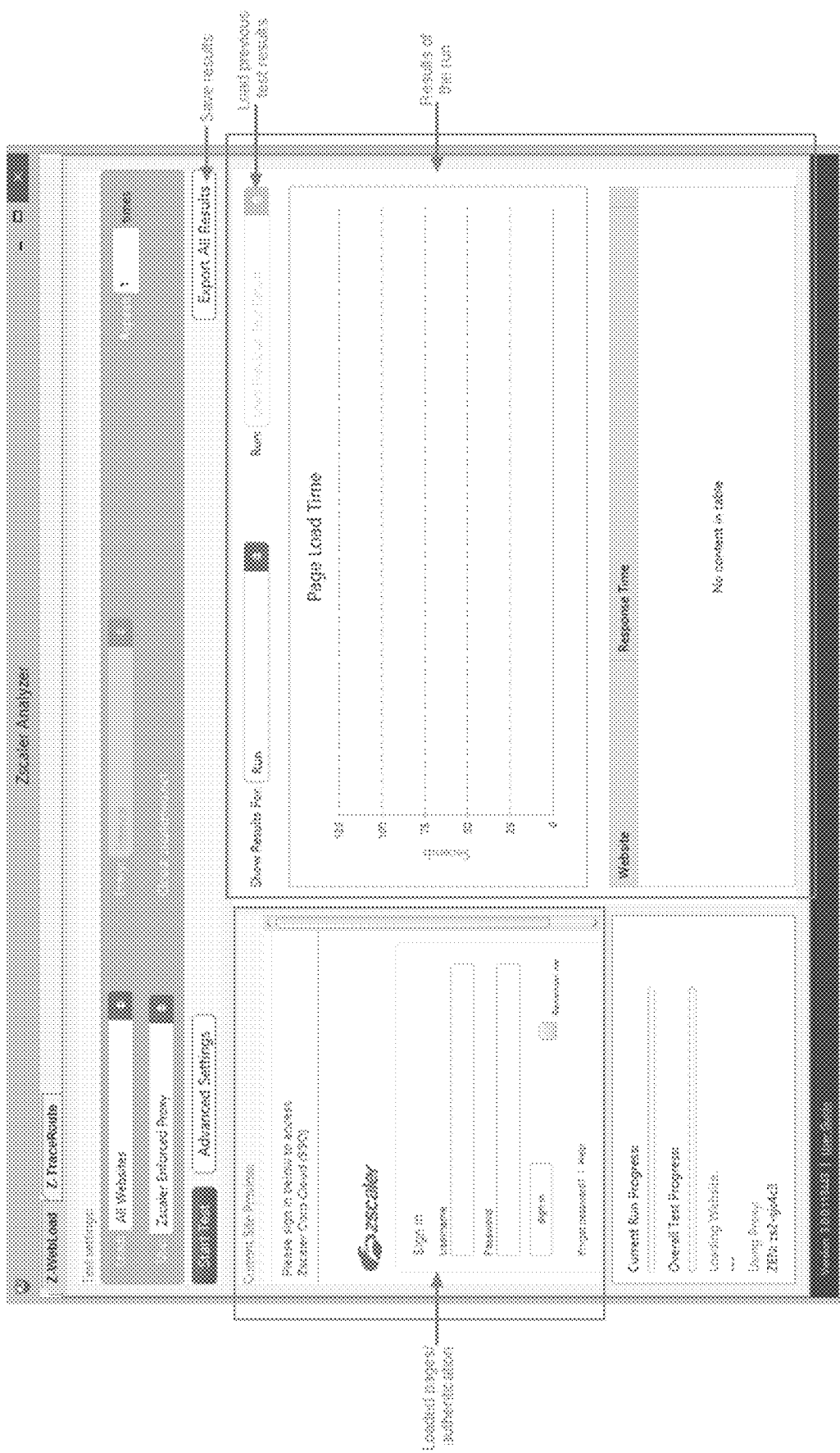
FIG. 14 is a GUI of the webload in the analyzer app.

FIG. 14 illustrates a GUI of the webload in the analyzer app 604. Here, there is a current site preview. The webload allows the analyzer app 604 to analyze the time it takes for a browser to load a web page, to detect potential issues. The analyzer app 604 performs a web page load test, and the results provide all the information needed to debug issues quickly. Depending on the environment, the analyzer app 604 can compare the load time through the cloud based service 608 and the load time going directly to the Internet. The analyzer app 604 can be run multiple times at different intervals, for a more comprehensive view of the network.

The settings in the webload can include load, run frequency, and use. The load can set how many times the analyzer app 604 loads a Uniform Resource Locator (URL). For example, the analyzer app 604 can test up to ten URLs at a time. The analyzer app 604 can provide a default list of URLs to run and the URLs can be selected one, a subset, or all. The advanced settings can be used to remove or add a URL.

For the run frequency, the analyzer app 604 can run automatically at different intervals. For the use, the Page Load Time widget provides different results depending on the environment when the analyzer app 604 is run. If the traffic is going through the cloud based service 608 when the analyzer app 604 starts, the analyzer app 604 is running through a proxy. If the user is not authenticated to the service, the user may be asked to authenticate when the analyzer app 604 is first opened. The authentication page is displayed in the Current Site Preview on the left in FIG. 14.

Figure 15:
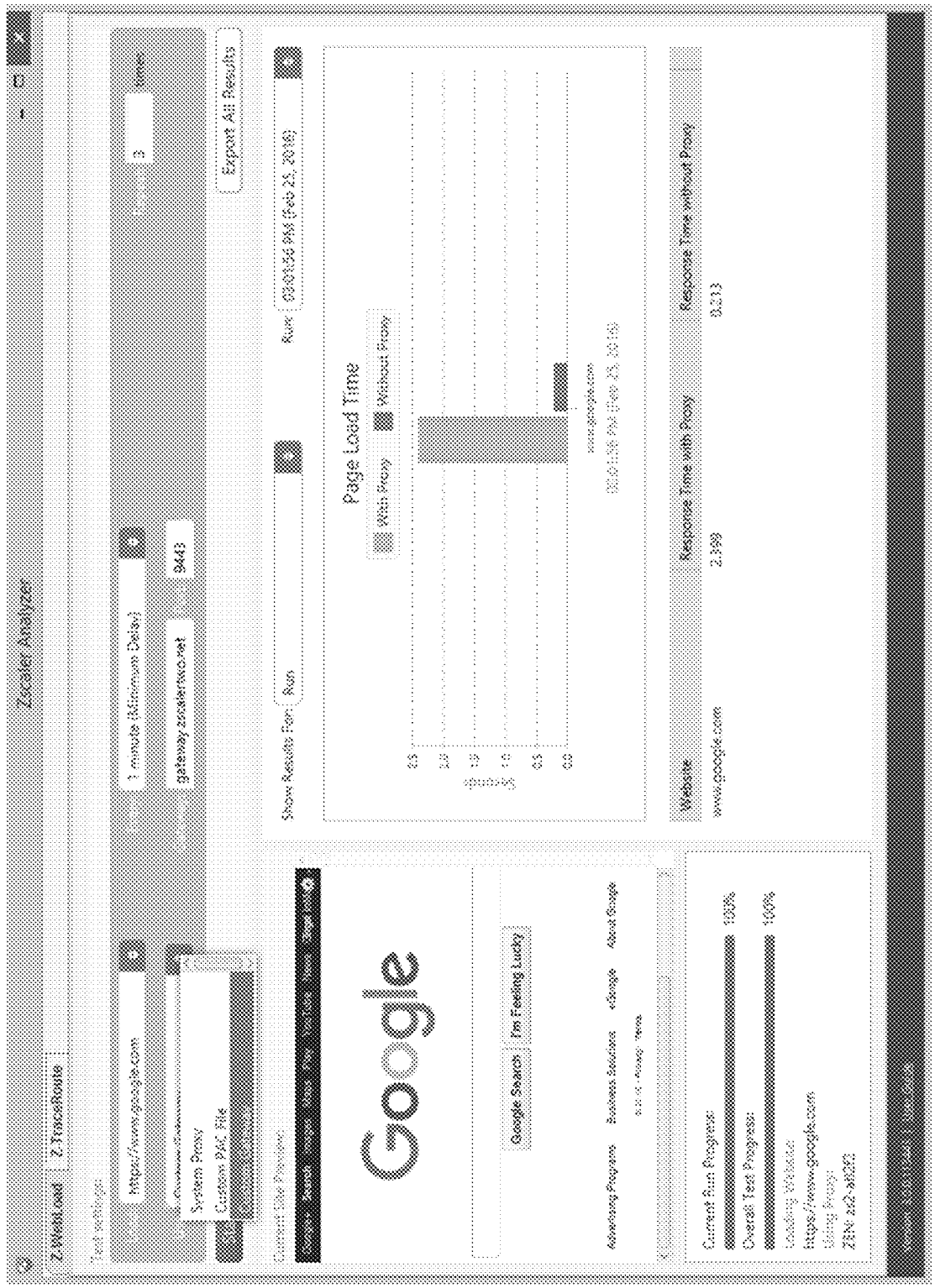
FIG. 15 is a GUI of the webload after selecting the custom gateway and providing results for page load time.

If your traffic is not going through the cloud based service 608 when the analyzer app 604 starts, the following options can be chosen in a list, namely system proxy, custom PAC (Proxy Auto Config) file, custom gateway. FIG. 15 illustrates a GUI of the webload after selecting the custom gateway and providing results for page load time. The system proxy is chosen to use browser settings. For example, if the user device 606 is configured for the browser to use a PAC file or the cloud based system 608, the analyzer app 604 will use those settings. The custom PAC file is chosen to use a PAC file to forward traffic to the cloud based system 608. For example, the cloud based system 608 can include hosts default PAC files which are configured to automatically forward all browser traffic to the nearest cloud node 502 or processing node 110. The custom gateway is chosen to specify a cloud node 502 or processing node 110 to forward traffic. To specify a cloud node 502 or processing node 110, enter the following: gateway.<cloud_name> and the port number.

Figure 16:
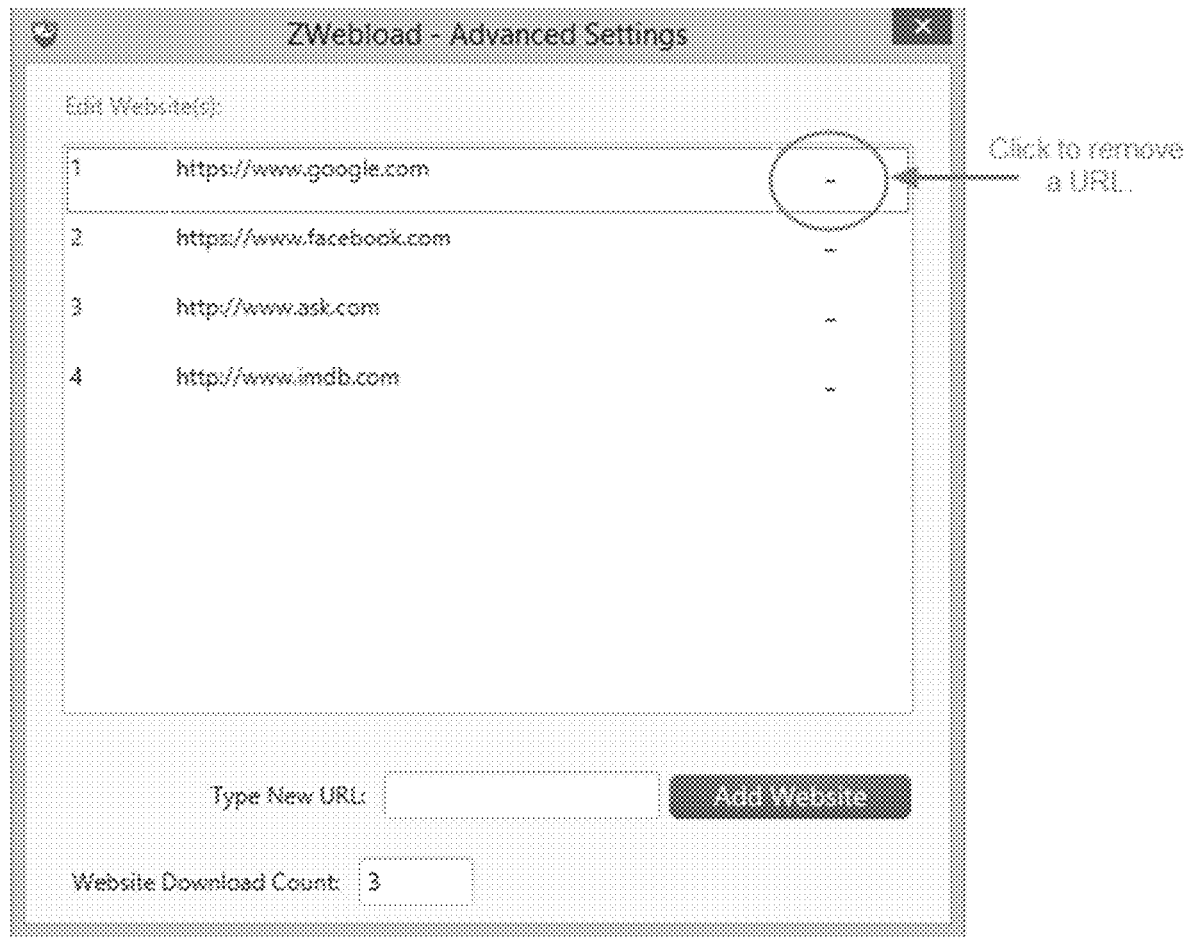
FIG. 16 is a GUI for advanced settings of the webload in the analyzer app.

If the custom PAC file or custom gateway is chosen, the user will be prompted to authenticated prior to the start of the test, such as in the current site preview. The results table can provide results in the following categories: With Proxy: the traffic is going through the cloud based service 608 and Without Proxy: the traffic is not going through the cloud based service 608. FIG. 16 is a GUI for advanced settings of the webload in the analyzer app 604. Here, websites can be added/removed, and download counts can be set.

Figure 17:
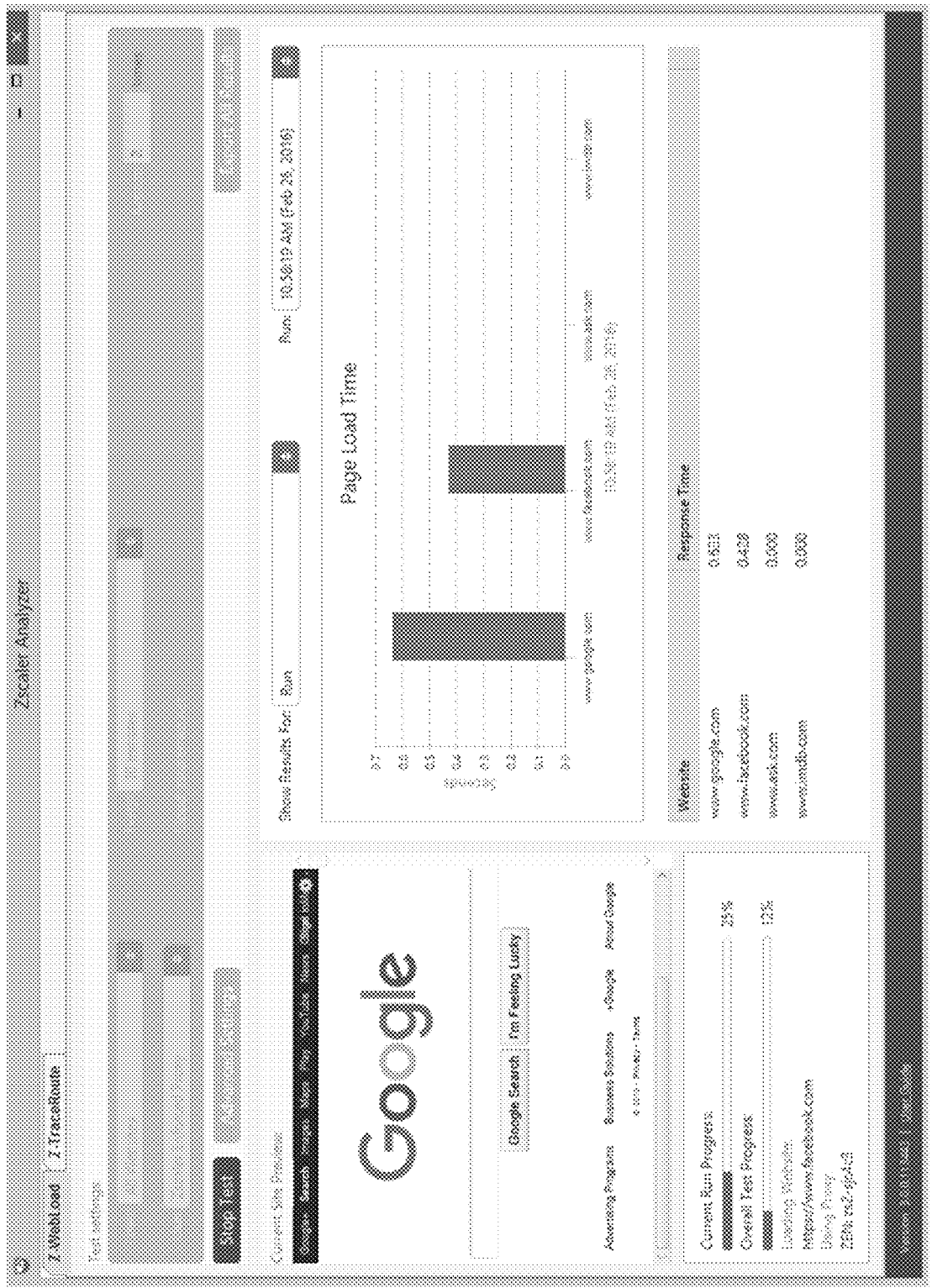
FIG. 17 is a GUI of the webload in the process of a test.
Figure 18:
FIG. 18 is a GUI of the results of the webload from the process of FIG. 17.
Figure 19:
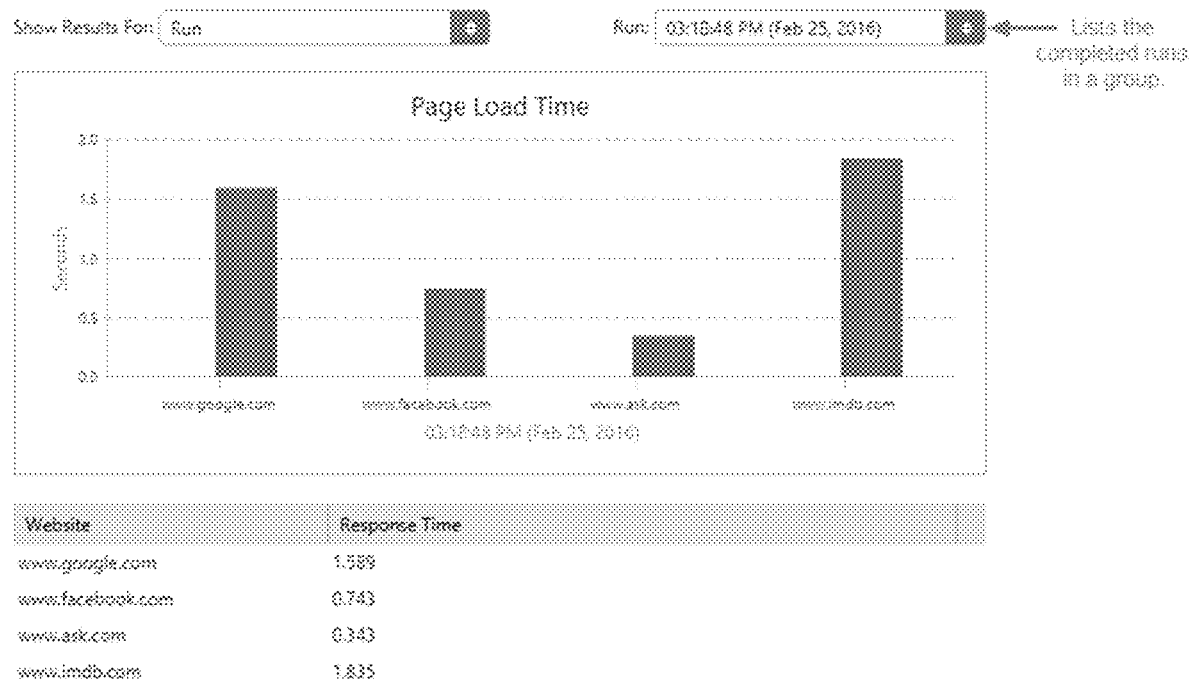
FIG. 19 is a view of the results from the webload.
Figure 20:
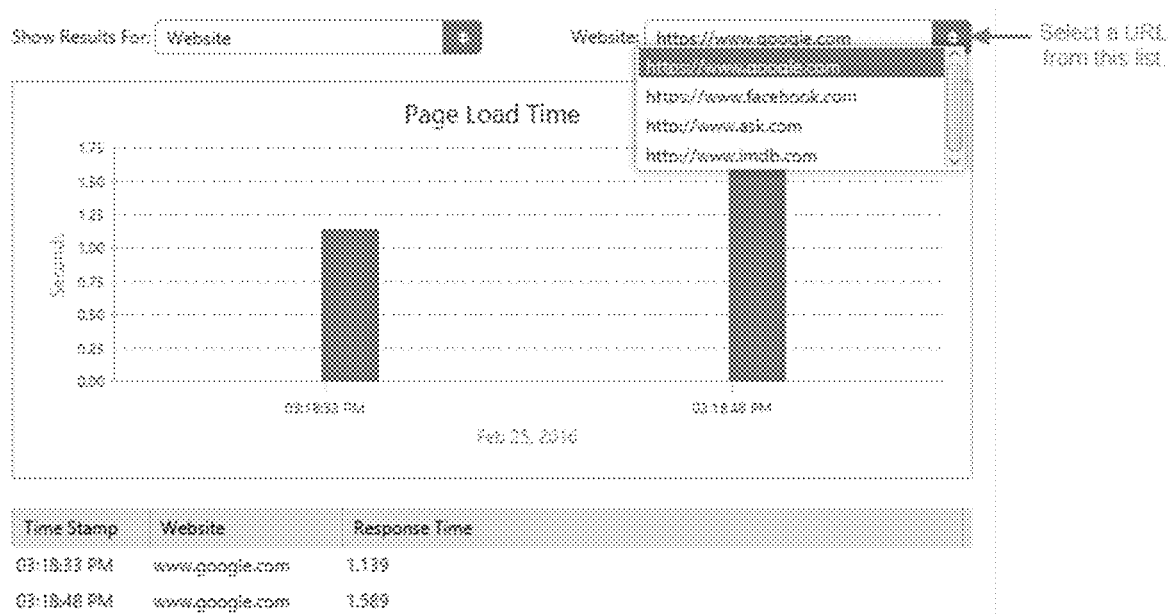
FIG. 20 is a view of the results for a single URL from multiple tested URLs from the webload.

FIG. 17 illustrates a GUI of the webload in the process of a test and FIG. 18 illustrates a GUI of the results of the webload from the process of FIG. 17. FIG. 19 illustrates a view of the results. If the analyzer app 604 has performed multiple runs, the results can be viewed for each completed run in the group by selecting it from the results list, as shown in FIG. 19. FIG. 20 illustrates a view of the results for a single URL from multiple tested URLs. If the analyzer app 604 was configured to test multiple URLs, the results can be viewed for each URL by clicking or selecting each URL as shown in FIG. 20. The Page Load Time widget shows how long it took the browser to load a web page. The results table provides an overview of the results. It shows the following: Time Stamp: The time when the test started, Website: The tested URL, and Response Time: The average time it took the browser to load the main web page.

When the analyzer app 604 completes all the configured runs for the webload, the analyzer app 604 can export the results. The following is the information displayed for each group (repetitions of the same test): Result Import Time: Time of the data export; Tool Version: Version number of the app; Group Number: Group ID; WebLoad Settings: The defined settings for the test; Number of Runs: Number of tests run; Proxy Type: Name of the proxy from which the test was run; Gateway Name: Name of the gateway from which the test was run; Gateway IP: IP address of the gateway from which the test was run; and CN: The cloud node from which the test was run.

The following is the information displayed for each run inside a group: Run Number: Run ID; Start Time: Time when the test started; End Time: Time when the test ended; Test Finished in: Duration of the test; and SNo: Results of the test for each immediate host. The results for each intermediate host can include URL: The tested URL; URL IP: IP address of the URL tested; Load Count: The number of times the URL was repeated; Response Code: The HTTP response code for successful or failed requests; DNS Time: The time it took client to contact DNS server; Connect Time: The time it took browser to connect to the server; and Full Page Time: The time it took the browser to load the entire web page and all its assets, such as images, scripts, etc.

Figure 21:
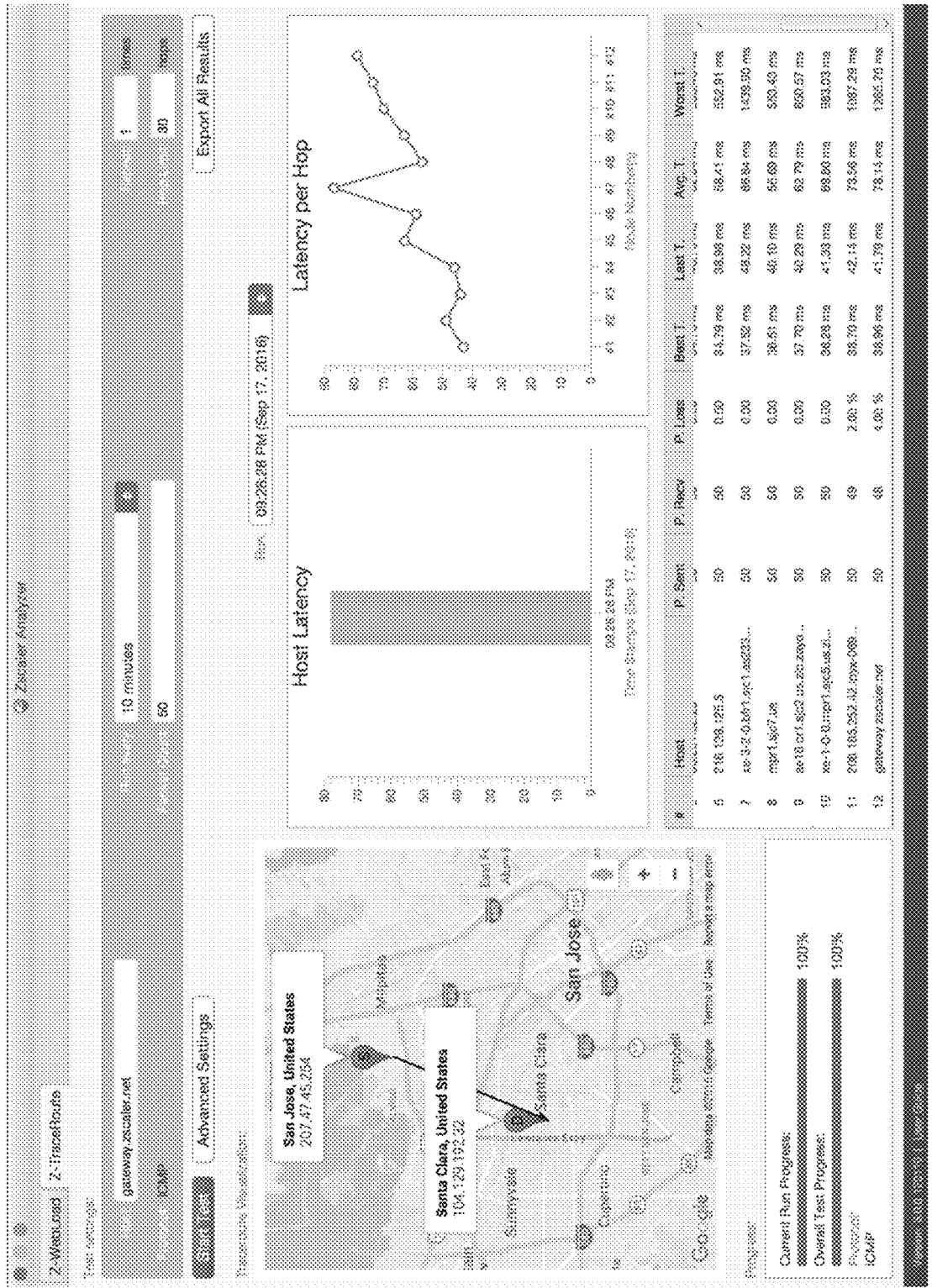
FIG. 21 is a GUI of another exemplary implementation of the MTR.
Figure 22:
FIG. 22 is a GUI of another exemplary implementation of the webload.
Figures 23, 24:
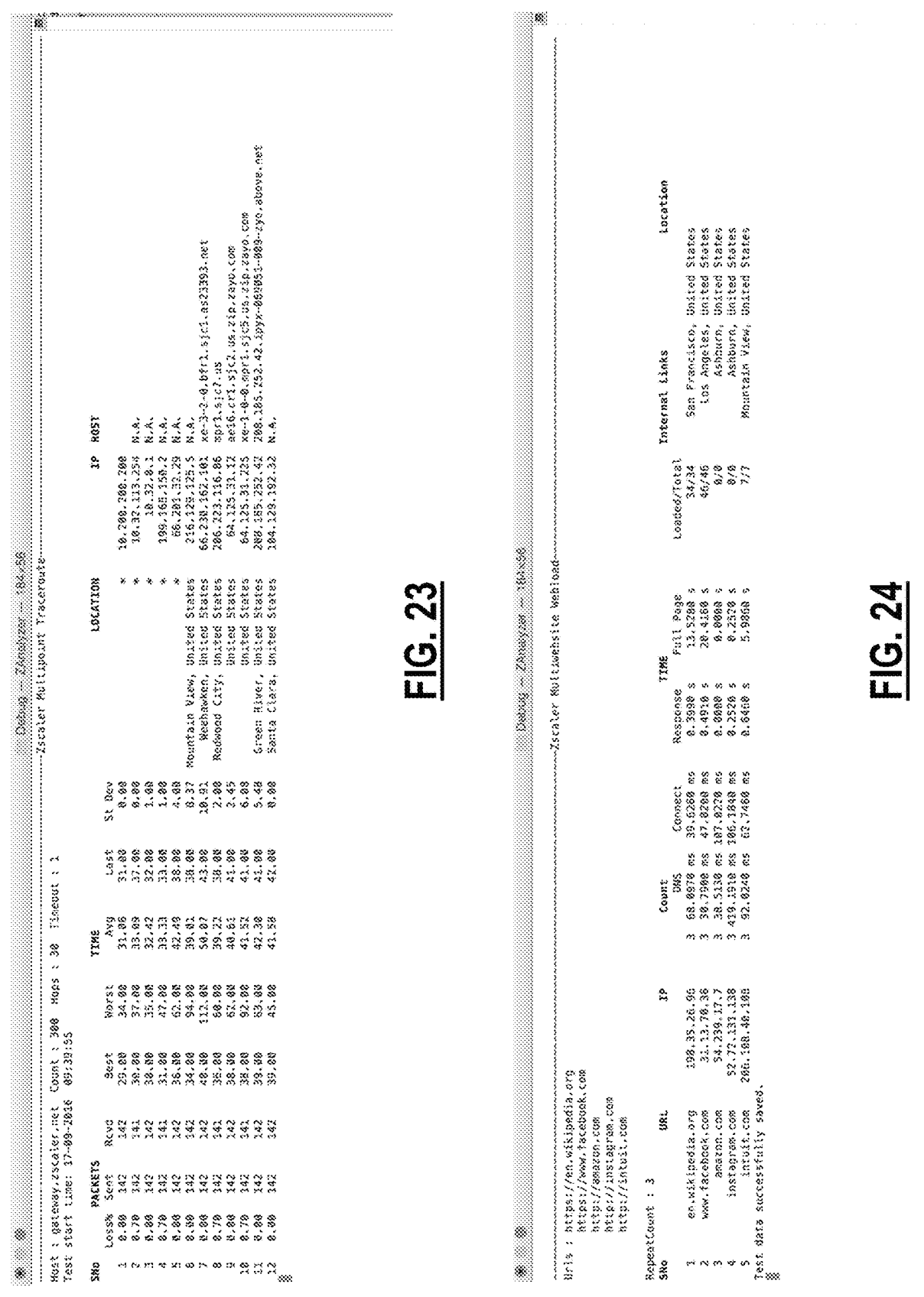

FIGS. 21-22 illustrate GUIs for another exemplary implementation of the MTR (FIG. 21) and the webload (FIG. 22). FIGS. 23-24 illustrate results from the exemplary implementation of the MTR of FIG. 21 (FIG. 23) and the webload of FIG. 22 (FIG. 24). As can be seen in the results, detailed information is captured.

§ 7.4 Method for Troubleshooting and Performance Analysis

Figure 25:
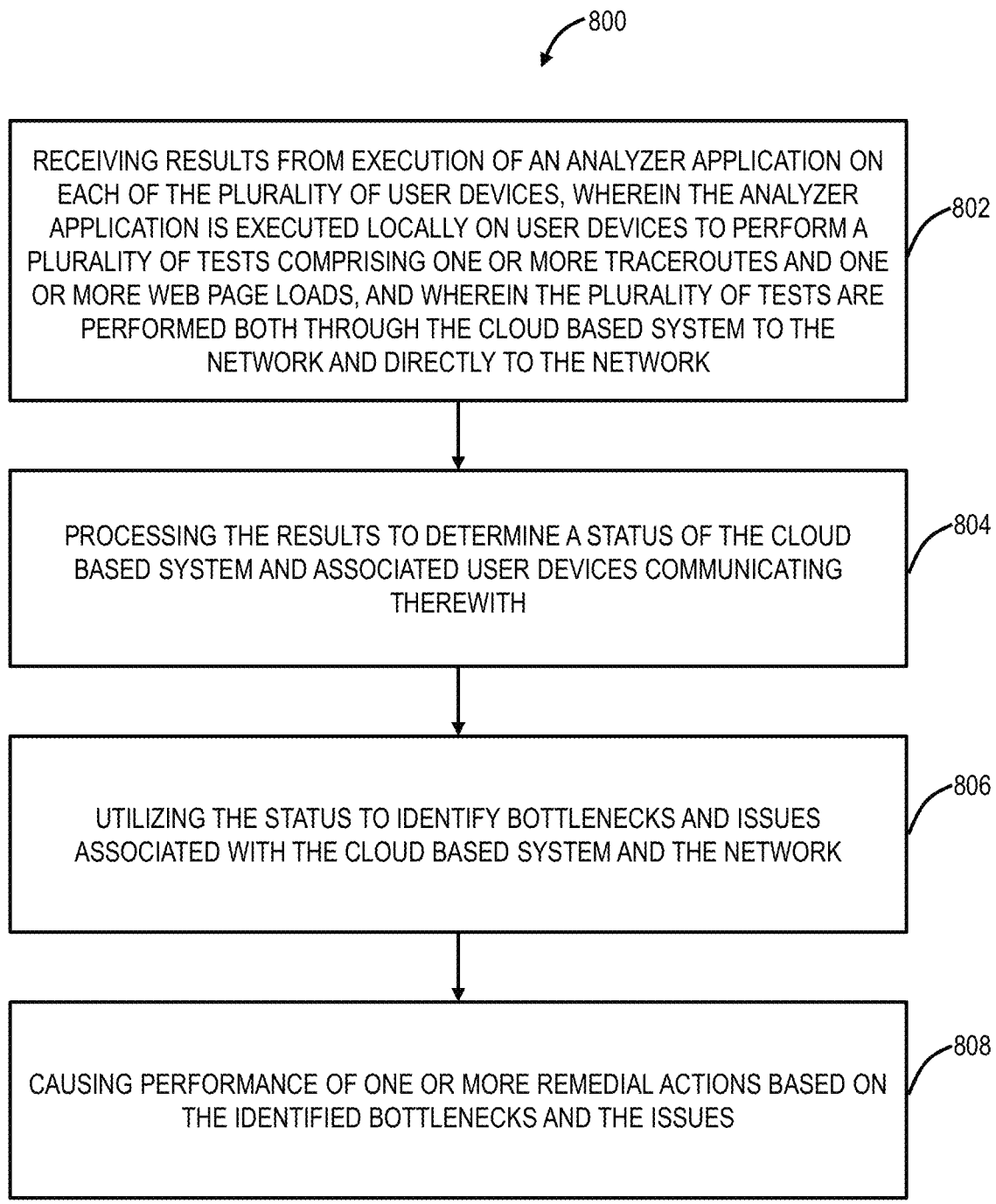
FIG. 25 is a flowchart of a method for troubleshooting and performance analysis of a cloud based system.

Referring to FIG. 25, in an exemplary embodiment, a flowchart illustrates a method 800 for troubleshooting and performance analysis of a cloud based system. The method 800 is implemented by an analyzer service executed on one or more servers, and the analyzer service is communicatively coupled to a network and to a plurality of user devices. The method 800 includes receiving results from execution of an analyzer application on each of the plurality of user devices, wherein the analyzer application is executed locally on user devices to perform a plurality of tests including one or more traceroutes and one or more web page loads, and wherein the plurality of tests are performed both through the cloud based system to the network and directly to the network (step 802); processing the results to determine a status of the cloud based system and associated user devices communicating therewith (step 804); utilizing the status to identify bottlenecks and issues associated with the cloud based system and the network (step 806); and causing performance of one or more remedial actions based on the identified bottlenecks and the issues (step 808).

The method 800 can further include receiving results from execution of an analyzer application on the cloud based system which corresponds to the results from the associated analyzer application executed locally on the associated user device. The method 800 can further include causing the execution of the analyzer application on a particular user device responsive to a troubleshooting notification associated with the particular user device. The traceroutes can include a My Traceroute (MTR) and the web page loads load one or more Uniform Resource Locators (URLs) either through a system proxy, a custom PAC (Proxy Auto Config) file, and a custom gateway. The traceroutes detect host latency and latency per hop in the network and the web page loads detect a response time for loading one or more Uniform Resource Locators (URLs). The one or more remedial actions can include causing maintenance on the user device based on misconfigurations, out-of-date software, and hardware deficiencies; causing maintenance on the network based on misconfigurations and hardware deficiencies; and causing maintenance on the cloud based system based on misconfigurations and hardware deficiencies The method 800 can further include monitoring the results over time; and processing the monitored results over time to determine upgrades in network capacity, processing capacity, and geographic locations of the cloud based system. The results can include geographic location of the user devices and associated nodes in the cloud based system, processing latency introduced by the cloud based system, response time, application performance in the cloud based system, and service availability of the cloud based system. The cloud based system can include a distributed security system monitoring and protecting the user devices from a plurality of security threats, wherein the distributed security system provides in-line protection of the user devices, independent of device type, hardware configuration, operating system, geographic location, and physical network location.

In another exemplary embodiment, a cloud based system configured for troubleshooting and performance analysis thereof includes one or more cloud nodes executed on one or more servers and communicatively coupled to a plurality of user devices via a network for cloud access; and an analyzer service executed on one or more servers and communicatively coupled to the one or more cloud nodes and the plurality of user devices, wherein the analyzer service is configured to receive results from execution of an analyzer application on each of the plurality of user devices, wherein the analyzer application is executed locally on user devices to perform a plurality of tests including one or more traceroutes and one or more web page loads, and wherein the plurality of tests are performed both through the cloud based system to the network and directly to the network; process the results to determine a status of the cloud based system and associated user devices communicating therewith; utilize the status to identify bottlenecks and issues associated with the cloud based system and the network; and cause performance of one or more remedial actions based on the identified bottlenecks and the issues.

In a further exemplary embodiment, a user device configured for troubleshooting and performance analysis of a cloud based system includes a network interface communicatively coupled to a network, a data store, and a processor communicatively coupled to one another; and memory storing computer executable instructions, and in response to execution by the processor, the computer-executable instructions cause the processor to access the cloud based system for one or more functions therewith; execute an analyzer application to perform a plurality of tests including one or more traceroutes and one or more web page loads, and wherein the plurality of tests are performed both through the cloud based system to the network and directly to the network; and transmit the results to an analyzer service which processes the results to determine a status of the cloud based system and associated user devices communicating therewith, wherein the analyzer service utilizes the status to identify bottlenecks and issues associated with the cloud based system and the network and causes performance of one or more remedial actions based on the identified bottlenecks and the issues.

§ 7.5 Use of the Analyzer Service

As described herein, outputs and reports from the analyzer service 602 can be used to troubleshoot individual user problems. Additionally, the outputs and reports can be used to develop a historical view of the cloud system 500 for upgrades, network planning, etc. In an exemplary embodiment, the outputs and reports can be collected over time and used to predict network congestion in advance enabling the cloud operator an opportunity to intelligently address the predicted network congestion. This collected data over time can be analyzed using Big Data predictive learning techniques. For example, with thousands or even millions of users executing the analyzer app 604, there is a vast amount of historical data collected and analyzed by the analyzer server 602. The predictive learning techniques can comb this data to discover patterns in the data including relationships that can be used for prediction of network congestion.

The cloud system 500 can also be proactively maintained by monitoring performance trends and extrapolation using statistical/machine learning techniques from the analyzer service 602. One exemplary aspect can include optimizing cloud data center selection for better performance by using what-if-scenario analysis. All these use case scenarios are possible from the collected measurement data for each run of the analyzer service 602 in the cloud. In an exemplary embodiment, the analyzer service 602 can use MongoDB for data management which is compatible with and is a component of a Big Data technology stack.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for troubleshooting and performance analysis of a cloud-based system, the method implemented by an analyzer service executed on one or more servers, and the analyzer service communicatively coupled to a network and to a plurality of user devices, the method comprising:
receiving results from execution of an analyzer application on each of the plurality of user devices, wherein the analyzer application is executed locally on user devices to perform a plurality of tests comprising one or more traceroutes and one or more web page loads, and wherein the plurality of tests are performed both through the cloud based system to the network and directly to the network;
receiving additional results from execution of an additional analyzer application on the cloud-based system, wherein the additional analyzer application is executed on the cloud-based system to perform the plurality of tests comprising one or more traceroutes and one or more web page loads;
processing the results and additional results to determine a status of the cloud-based system and associated user devices communicating therewith, wherein the status is determined in part based on a comparison of the plurality of tests performed both through the cloud based system to the network and directly to the network;
utilizing the status to identify where bottlenecks exist in the cloud-based system and network and identify issues associated with the cloud-based system and the network; and
causing performance of one or more remedial actions based on the identified bottlenecks and the issues.

2. The method of claim 1, further comprising:
causing the execution of the analyzer application on a particular user device responsive to a troubleshooting notification associated with the particular user device.

3. The method of claim 1, wherein the traceroutes comprise a My Traceroute (MTR) and the web page loads load one or more Uniform Resource Locators (URLs) either through a system proxy, a custom PAC (Proxy Auto Config) file, and a custom gateway.

4. The method of claim 1, wherein the traceroutes detect host latency and latency per hop in the network and the web page loads detect a response time for loading one or more Uniform Resource Locators (URLs).

5. The method of claim 1, wherein the one or more remedial actions comprise:
causing maintenance on at least one of the user devices based on misconfigurations, out-of-date software, and hardware deficiencies;
causing maintenance on the network based on misconfigurations and hardware deficiencies; and
causing maintenance on the cloud-based system based on misconfigurations and hardware deficiencies.

6. The method of claim 1, further comprising:
monitoring the results over time; and
processing the monitored results over time to determine upgrades in network capacity, processing capacity, and geographic locations of the cloud-based system.

7. The method of claim 1, wherein the results comprise geographic location of the user devices and associated nodes in the cloud-based system, processing latency introduced by the cloud-based system, response time, application performance in the cloud-based system, and service availability of the cloud-based system.

8. The method of claim 1, wherein the cloud-based system comprises a distributed security system monitoring and protecting the user devices from a plurality of security threats, wherein the distributed security system provides in-line protection of the user devices, independent of device type, hardware configuration, operating system, geographic location, and physical network location.

9. A cloud-based system configured for troubleshooting and performance analysis thereof, the cloud-based system comprising:
one or more cloud nodes executed on one or more servers and communicatively coupled to a plurality of user devices via a network for cloud access; and
an analyzer service executed on one or more servers and communicatively coupled to the one or more cloud nodes and the plurality of user devices, wherein the analyzer service is configured to:
receive results from execution of an analyzer application on each of the plurality of user devices, wherein the analyzer application is executed locally on user devices to perform a plurality of tests comprising one or more traceroutes and one or more web page loads, and wherein the plurality of tests are performed both through the cloud based system to the network and directly to the network;
process the results to determine a status of the cloud-based system and associated user devices communicating therewith, wherein the status is determined in part based on a comparison of the plurality of tests performed both through the cloud based system to the network and directly to the network;
utilize the status to identify where bottlenecks exist in the cloud-based system and network and identify issues associated with the cloud-based system and the network;
cause performance of one or more remedial actions based on the identified bottlenecks and the issues; and
cause the execution of the analyzer application on a particular user device responsive to a troubleshooting notification associated with the particular user device.

10. The cloud-based system of claim 9, wherein the analyzer service is further configured to
receive additional results from execution of an additional analyzer application on the cloud-based system which corresponds to the results from the associated analyzer application executed locally on the associated user devices.

11. The cloud-based system of claim 9, wherein the traceroutes comprise a My Traceroute (MTR) and the web page loads load one or more Uniform Resource Locators (URLs) either through a system proxy, a custom PAC (Proxy Auto Config) file, and a custom gateway.

12. The cloud-based system of claim 9, wherein the traceroutes detect host latency and latency per hop in the network and the web page loads detect a response time for loading one or more Uniform Resource Locators (URLs).

13. The cloud-based system of claim 9, wherein the one or more remedial actions comprise:
maintenance on at least one of the user devices based on misconfigurations, out-of-date software, and hardware deficiencies;
maintenance on the network based on misconfigurations and hardware deficiencies; and
maintenance on the cloud-based system based on misconfigurations and hardware deficiencies.

14. The cloud-based system of claim 9, wherein the analyzer service is further configured to
monitor the results over time; and
process the monitored results over time to determine upgrades in network capacity, processing capacity, and geographic locations of the cloud-based system.

15. The cloud-based system of claim 9, wherein the results comprise geographic location of the user devices and associated nodes in the cloud-based system, processing latency introduced by the cloud-based system, response time, application performance in the cloud-based system, and service availability of the cloud-based system.

16. The cloud-based system of claim 9, wherein the cloud-based system comprises a distributed security system monitoring and protecting the user devices from a plurality of security threats, wherein the distributed security system provides in-line protection of the user devices, independent of device type, hardware configuration, operating system, geographic location, and physical network location.

17. A user device configured for troubleshooting and performance analysis of a cloud-based system, the user device comprising:
a network interface communicatively coupled to a network, a data store, and a processor communicatively coupled to one another; and
memory storing computer executable instructions, and in response to execution by the processor, the computer-executable instructions cause the processor to access the cloud-based system for one or more functions therewith;
execute an analyzer application to perform a plurality of tests comprising one or more traceroutes and one or more web page loads, and wherein the plurality of tests are performed both through the cloud-based system to the network and directly to the network;
transmit the results to an analyzer service which processes the results to determine a status of the cloud-based system and associated user devices communicating therewith, wherein the analyzer service utilizes the status to identify where bottlenecks exist in the cloud-based system and network and where issues associated with the cloud-based system and the network and causes performance of one or more remedial actions based on the identified bottlenecks and the issues, and wherein the status is determined in part based on a comparison of the plurality of tests performed both through the cloud based system to the network and directly to the network; and cause the execution of the analyzer application responsive to a troubleshooting notification associated with the user device.

18. The user device of claim 17, wherein the results comprise geographic location of the user device and associated nodes in the cloud-based system, processing latency introduced by the cloud-based system, response time, application performance in the cloud-based system, and service availability of the cloud-based system.

* * * * *